US012606048B2

(12) United States Patent
    Rasulov

(10) Patent No.: US 12,606,048 B2
(45) Date of Patent: Apr. 21, 2026

(54) SWAPPABLE BATTERY FOR ELECTRIFIED VEHICLE AND METHOD OF CONSTRUCTION

(71) Applicant: Tofik Rasulov, Winnetka, CA (US)

(72) Inventor: Tofik Rasulov, Winnetka, CA (US)

( * ) Notice: Subject to any disclaimer, the term of this patent is extended or adjusted under 35 U.S.C. 154(b) by 0 days.

(21) Appl. No.: 19/260,566

(22) Filed: Jul. 6, 2025

(65) Prior Publication Data

US 2026/0048679 A1 Feb. 19, 2026

Related U.S. Application Data

(60) Provisional application No. 63/684,414, filed on Aug. 18, 2024.

(51) Int. Cl.
    *B60L 53/80* (2019.01)
    *B60L 50/60* (2019.01)
    (Continued)

(52) U.S. Cl.
    CPC .............. *B60L 53/80* (2019.02); *B60L 50/66* (2019.02); *B60L 58/26* (2019.02); *B60L 58/27* (2019.02); *H01M 10/425* (2013.01); *H01M 10/486* (2013.01); *H01M 50/224* (2021.01); *H01M 50/227* (2021.01); *H01M 50/242* (2021.01); *H01M 50/264* (2021.01); *H01M 2010/4271* (2013.01); *H01M 2200/103* (2013.01)

(58) Field of Classification Search
    CPC .......... B60L 53/80; B60L 50/66; B60L 58/26; B60L 58/27; H01M 10/425; H01M 10/486; H01M 50/224; H01M 50/227; H01M 50/242; H01M 50/264; H01M 2010/4271; H01M 2200/103
    See application file for complete search history.

(56) References Cited

U.S. PATENT DOCUMENTS

| | | | |
|---|---|---|---|
| 6,445,080 B1 * | 9/2002 | Daqoa | B60K 5/00 307/9.1 |
| 7,434,611 B2 * | 10/2008 | Wunderlich | B60H 1/00428 237/12.3 A |

(Continued)

FOREIGN PATENT DOCUMENTS

WO WO-2017198416 A1 * 11/2017 .............. B60K 1/04

*Primary Examiner* — Jacob B Meyer
(74) *Attorney, Agent, or Firm* — Edmond DeFrank

(57) ABSTRACT

The embodiments disclose a swappable battery system for electrified vehicles includes a rigid frame formed from metal or composite materials and configured for mounting on the vehicle roof. A rooftop cover encloses at least a portion of the frame, and a fire-retardant hard plastic plate forms the insulated floor. At least two openable side panels allow access to the compartment. Integrated front, rear, and side ventilation sections feature motorized louvers that regulate airflow and internal temperature. A plurality of swappable low voltage battery modules are removably installed within the frame and provide power to the vehicle's electric motor and battery control systems. A main battery management system is operatively coupled to the battery modules and configured to monitor voltage, temperature, charge state, and operational parameters. The system extends vehicle range by enabling fast battery replacement and maintaining safe, efficient energy delivery and thermal regulation during operation.

20 Claims, 44 Drawing Sheets

(51) Int. Cl.

| | |
|---|---|
| B60L 58/26 | (2019.01) |
| B60L 58/27 | (2019.01) |
| H01M 10/42 | (2006.01) |
| H01M 10/48 | (2006.01) |
| H01M 50/224 | (2021.01) |
| H01M 50/227 | (2021.01) |
| H01M 50/242 | (2021.01) |
| H01M 50/264 | (2021.01) |

(56) References Cited

U.S. PATENT DOCUMENTS

| | | | | |
|---|---|---|---|---|
| 7,976,067 | B2 * | 7/2011 | Naganuma | B60H 1/00371 |
| | | | | 180/69.2 |
| 8,302,997 | B2 * | 11/2012 | Veenstra | B60K 15/07 |
| | | | | 280/832 |
| 12,043,102 | B2 * | 7/2024 | Ruiz | B60L 50/66 |
| 2008/0006461 | A1 * | 1/2008 | Naganuma | B60H 1/00428 |
| | | | | 180/69.4 |
| 2020/0358150 | A1 * | 11/2020 | Fields | H01M 10/65 |

* cited by examiner

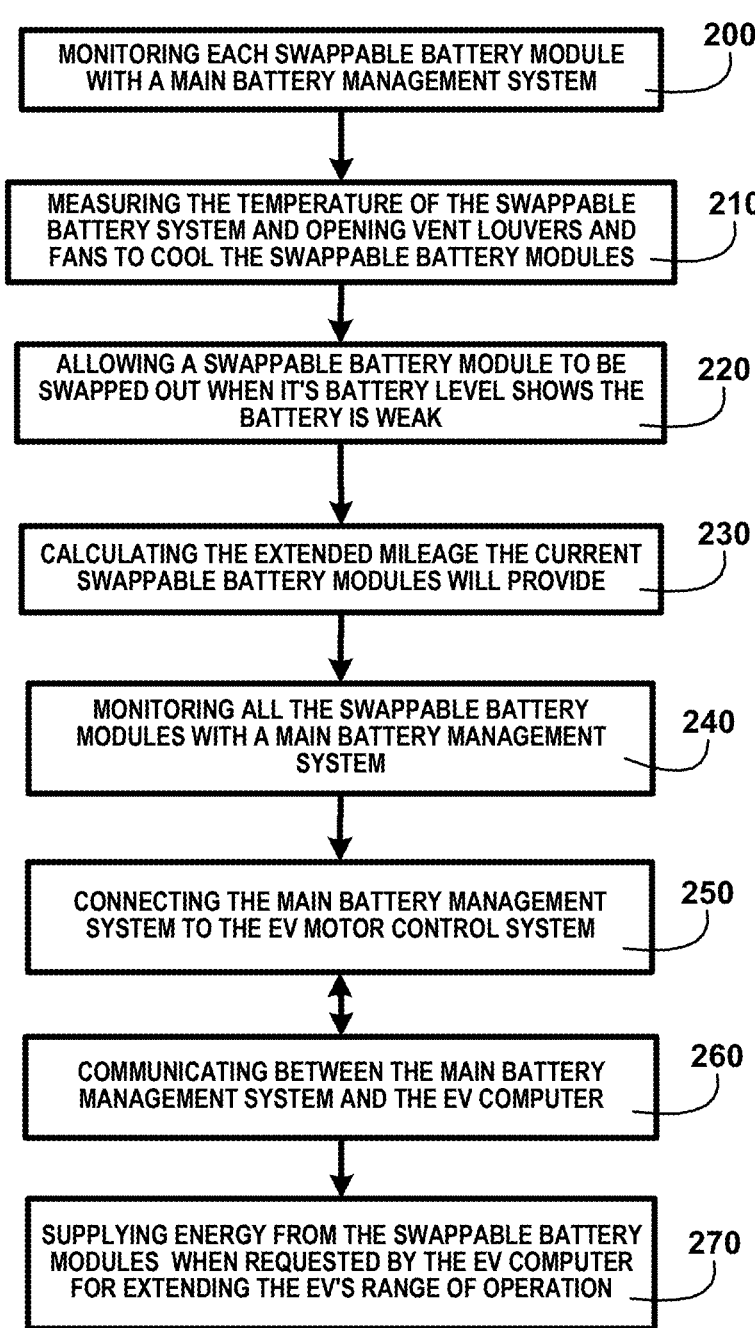

MONITORING EACH SWAPPABLE BATTERY MODULE WITH A MAIN BATTERY MANAGEMENT SYSTEM — 200

MEASURING THE TEMPERATURE OF THE SWAPPABLE BATTERY SYSTEM AND OPENING VENT LOUVERS AND FANS TO COOL THE SWAPPABLE BATTERY MODULES — 210

ALLOWING A SWAPPABLE BATTERY MODULE TO BE SWAPPED OUT WHEN IT'S BATTERY LEVEL SHOWS THE BATTERY IS WEAK — 220

CALCULATING THE EXTENDED MILEAGE THE CURRENT SWAPPABLE BATTERY MODULES WILL PROVIDE — 230

MONITORING ALL THE SWAPPABLE BATTERY MODULES WITH A MAIN BATTERY MANAGEMENT SYSTEM — 240

CONNECTING THE MAIN BATTERY MANAGEMENT SYSTEM TO THE EV MOTOR CONTROL SYSTEM — 250

COMMUNICATING BETWEEN THE MAIN BATTERY MANAGEMENT SYSTEM AND THE EV COMPUTER — 260

SUPPLYING ENERGY FROM THE SWAPPABLE BATTERY MODULES WHEN REQUESTED BY THE EV COMPUTER FOR EXTENDING THE EV'S RANGE OF OPERATION — 270

TO
BATTERY
MODULE
BMS

TO
BACK
PLATE

TO BATTERY MODULE FRONT PLATE

TO BACK PLATE

TO BATTERY MODULE BMS

TO BACK PLATE

SWAPPABLE BATTERY FOR ELECTRIFIED VEHICLE AND METHOD OF CONSTRUCTION

BACKGROUND

The electrified vehicle (EV) fleet is expanding annually but faces constraints such as limited range and scarcity of fast charging stations, and exacerbating wait times. Even at rapid charging stations, the process takes around 30 minutes, leading to potential congestion as EV numbers rise. Additionally, the lack of charging infrastructure between major cities further complicates EV usage.

FIELD OF INVENTION

The invention is in the field of electrical power supply for electrified vehicles, which consists of rechargeable and exchangeable batteries.

BRIEF SUMMARY OF THE INVENTION

This invention pertains to electrified vehicle (EV) batteries and charging systems. EVs are equipped with a primary battery that requires lengthy recharge or replacement times. This innovation suggests implementing a swappable secondary battery system on the rooftop of EVs. It comprises a metallic structure and plastic cover housing multiple low voltage battery modules. These modules can be swiftly exchanged with fully charged ones at designated locations, either by consumers independently or with assistance from on-site personnel or self-service kiosks.

BRIEF DESCRIPTION OF THE DRAWINGS

FIG. 2 shows a block diagram of an overview of a diagram of a swappable battery system for an electrified vehicle (EV) of one embodiment.

DETAILED DESCRIPTION OF THE INVENTION

In the following description, reference is made to the accompanying drawings, which form a part hereof, and which are shown by way of illustration a specific example in which the invention may be practiced. It is to be understood that other embodiments may be utilized and structural changes may be made without departing from the scope of the present invention.

It should be noted that the descriptions that follow, for example, in terms of a swappable battery for electrified vehicles and method of construction are described for illustrative purposes and the underlying system can apply to any number and multiple types of vehicles. In one embodiment of the present invention, the swappable battery for electrified vehicles and method of construction can be configured using a swappable battery. The swappable battery for electrified vehicles and method of construction can be configured to include a rooftop cover and can be configured to include left and right-side opening panels using the present invention.

The terms used herein, including EV 110, electrified vehicle 110, and EV 110 are used interchangeably without any change in meaning.

Figure 1:
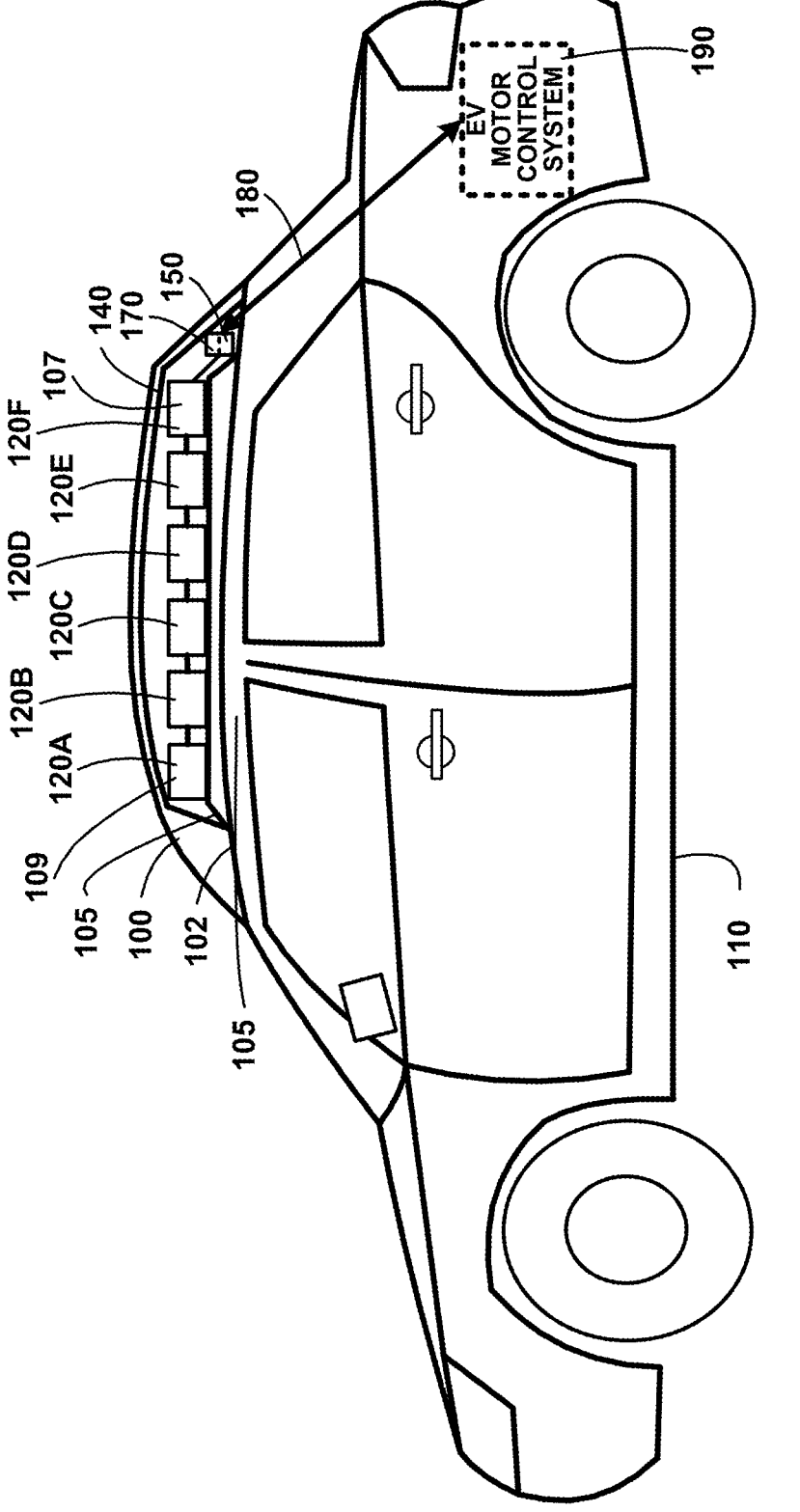
FIG. 1 shows for illustrative purposes only an example of a diagram of an electrified vehicle (EV) with a swappable battery system of one embodiment.

FIG. 1 shows for illustrative purposes only an example of a diagram of an electrified vehicle (EV) with a swappable battery system of one embodiment. FIG. 1 shows the cage structure 105 connected with non-conductive seals and brackets to the roof 102 of the EV 110. The cage structure 105 is a metal or composite materials framework compartment for swappable low voltage battery module assemblies. Housed inside the cage structure 105 is the left side bank of swappable low voltage battery module 1 of 12 120A, swappable low voltage battery module 2 of 12 120B, swappable low voltage battery module 3 of 12 120C, swappable low voltage battery module 4 of 12 120D, swappable low voltage battery module 5 of 12 120E and swappable low voltage battery module 6 of 12 120F. A top cover 100 made of hard plastic fire retardant and has slots at the front and back which open and close by louvers operated by an electric motor. The swappable low voltage battery module assemblies are protected with opening side panels 140 on both the left and right sides of the cage structure 105. The control unit 170 includes a main battery management system (BMS) 150 that monitors the charge levels of each swappable low voltage battery module and communicates with the EV computer to determine when the swappable low voltage battery module assemblies are automatically switched over through the swappable battery system cables 180 to power the EV motor through the EV motor control system 190 of one embodiment.

FIG. 2 shows a block diagram of an overview of a diagram of a swappable battery system for an electrified vehicle (EV) of one embodiment. FIG. 2 shows monitoring each swappable low voltage battery module with a battery management system 200. Measuring the temperature of the swappable battery system and opening vent louvers and fans to cool the swappable low voltage battery modules 210. Allowing a swappable low voltage battery module to be swapped out when its battery level shows the battery is weak 220. Calculating through the EV's computer the extended mileage the current swappable low voltage battery modules will provide 230. Monitoring all the swappable low voltage battery modules with a main battery management system 240 to determine the full charge level of the swappable battery system. Connecting the main battery management system to the EV motor control system 250. Communicating between the main battery management system and the EV computer 260. Supplying energy from the swappable low voltage battery modules when requested by the EV computer for extending the EV's range of operation 270.

Extending the range of an electrified vehicle 110 is a major focus in the development of EV technology, especially given the concerns around "range anxiety," where drivers fear running out of power before reaching a charging station. A practical solution to enhance the mileage capability of EVs is the integration of the swappable battery system 300 of FIG. 3. This system is a removable modular unit that can be attached when extended range is necessary. These external swappable low voltage battery modules 340 of FIG. 3 offer an innovative solution by providing additional power storage and ensuring longer travel distances without compromising the existing vehicle structure or main battery performance.

Figure 3:
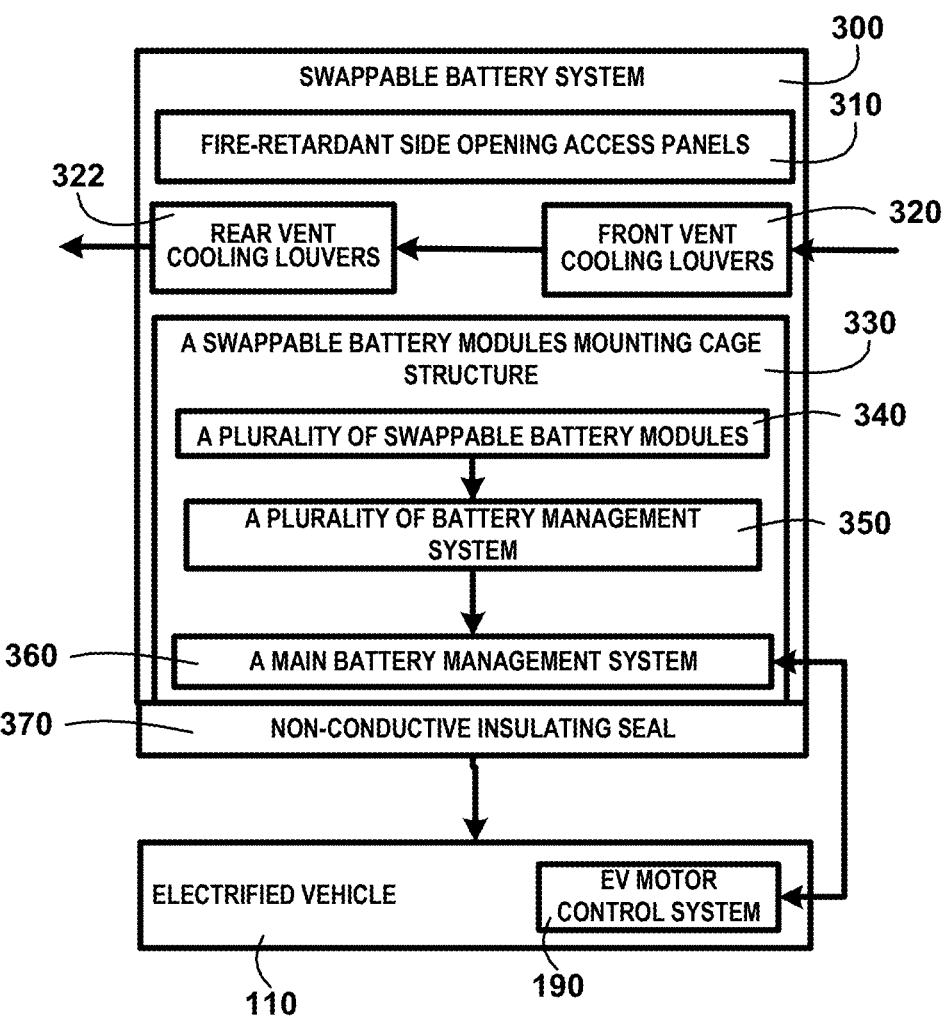
FIG. 3 shows a block diagram of an overview of the structure of a swappable battery system for an electrified vehicle (EV) of one embodiment.
Figure 5:
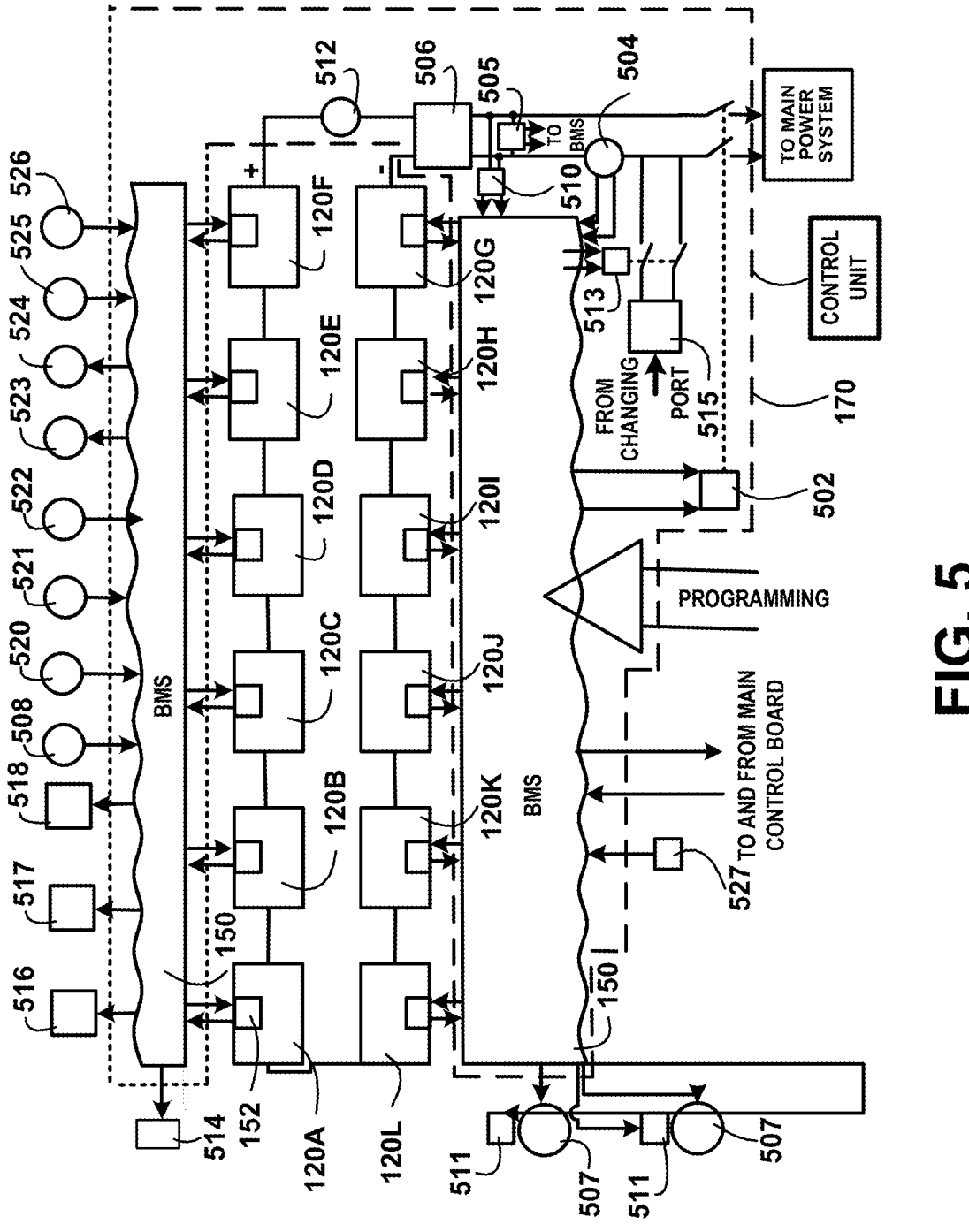
FIG. 5 shows for illustrative purposes only an example of a diagram of electrical devices of a swappable battery of one embodiment.

The swappable low voltage battery modules 340 of FIG. 3 connect seamlessly with power relay 502 of FIG. 5 with the motor control system in an EV. When attached, it could work in tandem with the main battery, effectively increasing the total energy storage capacity of the vehicle. This extension in power storage directly translates into an increased driving range, allowing drivers to travel further between charging sessions. The swappable battery system 300 of FIG. 3 main battery management system 360 of FIG. 3 is connected to the EV motor control system 190, which monitors the state of charge, temperature, and overall health of both the primary and swappable battery system 300 of FIG. 3. With a main battery management system (BMS) 150 of FIG. 1, the vehicle can prioritize the swappable battery system 300 power during the journey, preserving the main battery's energy for later use or more intensive driving phases, such as climbing hills or accelerating.

Integrating the swappable low voltage battery modules 340 of FIG. 3 into the EV design is accomplished with a modular connection. A modular connection allows drivers to switch the plurality of swappable low voltage battery modules 340 of FIG. 3 on and off as needed, effectively creating a "reserve tank" that the vehicle can draw from only when the main battery is depleted. These configurations offer flexibility in terms of usage and allow for more efficient energy distribution.

The removable plurality of swappable low voltage battery modules 340 of FIG. 3 can be attached to the vehicle when needed and removed when not in use, providing a versatile solution for drivers who only occasionally need extended range. A plurality of swappable low voltage battery modules 340 of FIG. 3 can be especially beneficial for long road trips or rural driving, where charging stations are sparse. The plurality of swappable low voltage battery modules 340 of FIG. 3 are compact, lightweight, and easily stored in the swappable battery system 300 of FIG. 3. When the primary battery is fully charged, the plurality of swappable low voltage battery modules 340 of FIG. 3 remain on standby, preserving energy until it is needed.

The swappable battery system 300 of FIG. 3 includes standardized connectors, allowing users to attach and detach modules with ease. The swappable battery system 300 enables a seamless transition between battery sources without requiring the vehicle to power down. This capability can save time, as drivers do not have to wait for a full charge from a stationary charging station. Additionally, the plurality of swappable low voltage battery modules 340 of FIG. 3 can be recharged separately from the vehicle, so drivers can have a fully charged unit ready to go for their next trip, extending the EV's effective range with minimal downtime.

The swappable battery system 300 of FIG. 3 also introduces flexibility in charging options. The swappable battery system 300 of FIG. 3 allows drivers to charge the swappable battery system 300 of FIG. 3 separately, either at a home charging or with portable solar charging panels. For eco-conscious drivers, the ability to recharge a swappable battery system 300 of FIG. 3 with renewable energy sources such as solar panels further enhances the environmental benefits of driving an EV 110 of FIG. 1. This approach aligns well with off-grid charging setups, enabling the EV 110 of FIG. 1 to partially or fully recharge while parked in remote or rural locations where standard EV charging stations may not be available.

Charging flexibility is particularly valuable for drivers who might be traveling in areas where traditional EV infrastructure is limited. For instance, if an EV owner wants to go on a camping trip, they can recharge the swappable battery system 300 of FIG. 3 with a solar setup, creating a self-sustaining energy loop that extends the EV 110 of FIG. 1 range and reduces reliance on charging stations. This setup also has potential applications in fleet management, as commercial EV fleets can use the swappable battery system 300 of FIG. 3 to maintain vehicle uptime and extend range without bringing the EV 110 of FIG. 1 out of service for frequent charging.

FIG. 3 shows a block diagram of an overview of the structure of a swappable battery system for an electrified vehicle (EV) of one embodiment. FIG. 3 shows a swappable battery system 300 including fire-retardant side opening access panels 310 on two sides. A front vent cooling louvers

320 and a rear vent cooling louvers 322 are openable to cool the batteries. A swappable low voltage battery module mounting cage structure 330 securely holds the plurality of swappable low voltage battery modules in place. The plurality of swappable low voltage battery modules 340 individually includes one of a plurality of battery management systems 350 to monitor the individual battery.

A main battery management system 360 monitors the plurality of swappable low voltage battery modules as a system. A non-conductive insulating seal 370 is provided between the swappable battery system 300 and any metal to prevent an electrical charge from entering the body of the electrified vehicle 110. The main battery management system 360 is connected to the EV motor control system 190 and allows communication between the control systems.

The swappable battery system 300 minimizes the weight added to the EV 110 and balances that against the energy efficiency. A plurality of swappable low voltage battery modules 340 increases the overall weight of the vehicle, which is at least partially offset by its increased energy efficiency and beneficial range extension. The swappable battery system 300, in one embodiment, uses high-energy-density materials, such as lithium-ion or solid-state battery technology, which provide maximum power storage with minimal added weight. The swappable battery system 300 offers high watt-hours per kilogram (Wh/kg) to achieve the desired range extension without significantly impacting the EV 110 performance. The swappable battery system 300 offers lightweight, aerodynamically efficient casings for the plurality of swappable low voltage battery modules 340 to mitigate the impact on EV 110 performance.

Lithium-ion batteries can be sensitive to high temperatures and require specific voltage ranges for safe operation, the swappable battery system 300 main battery management system 360 plays a critical role in ensuring safety. It constantly monitors the state of charge, voltage levels, and temperature to prevent overheating or overcharging. Advanced cooling systems, such as air-cooling front vent cooling louvers 320 and rear vent cooling louvers 322 mechanisms, are incorporated to maintain optimal operating temperatures, enhancing both the safety and longevity of the swappable battery system 300.

The swappable battery system 300 offers an effective solution to extending the range of electrified vehicles, reducing range anxiety, and making EVs more practical for long-distance travel. By using innovative components and energy-dense materials, the swappable battery system 300 can add meaningful mileage to the vehicle's range while maintaining safety, energy efficiency, and user convenience. Enabling EVs to perform reliably even in remote or infrastructure-limited areas.

Figure 4:
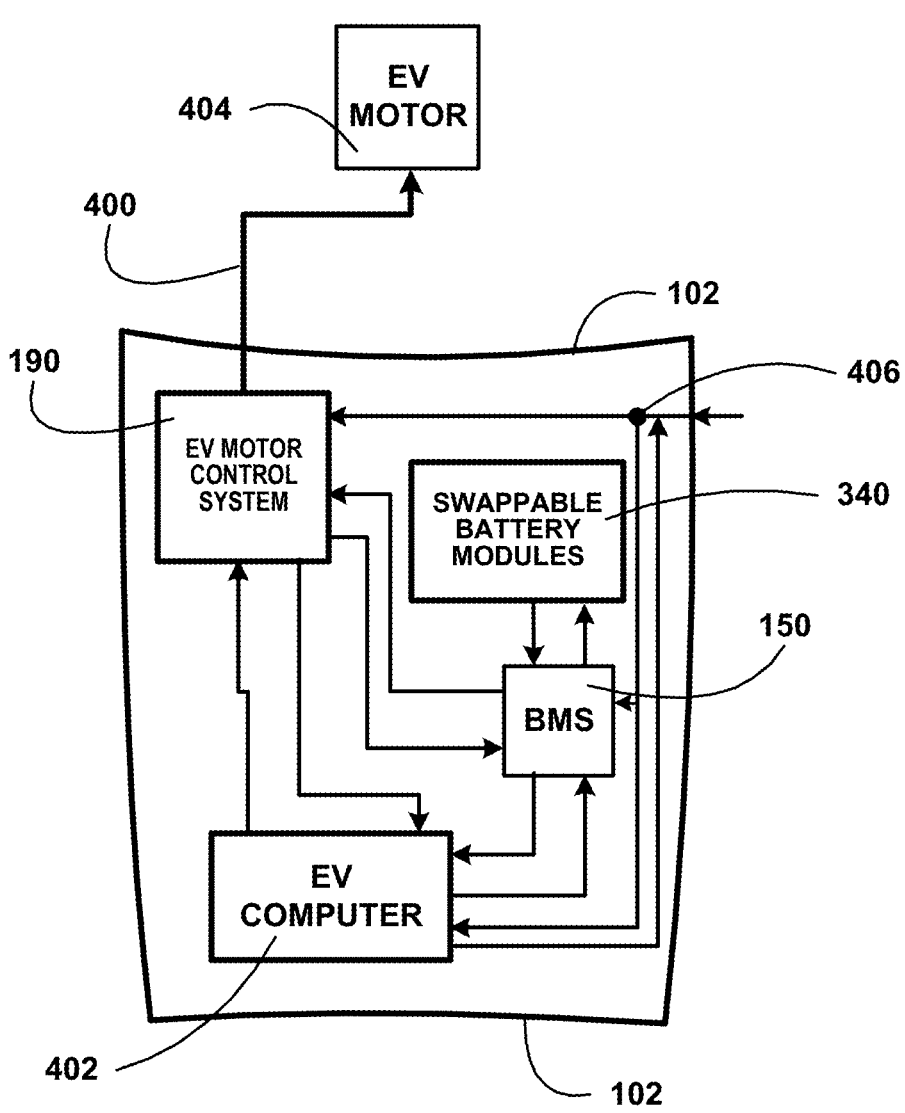
FIG. 4 shows for illustrative purposes only an example of a diagram of an electrified vehicle (EV) with a swappable battery and its main battery management system (BMS) of one embodiment.

FIG. 4 shows for illustrative purposes only an example of a diagram of an electrified vehicle (EV) with a swappable low voltage battery modules and its main battery management system (BMS) of one embodiment. FIG. 4 shows an overhead view of the roof 102 of an EV 110 of FIG. 1. Showing the BMS 150 using an EV computer 402 to coordinate with the motor control system 190 and through a connection 400 to conduct electrical power to the EV motor 404. Also showing is the charging port 406 to recharge swappable low voltage battery modules 340.

The swappable batteries positioned on an electrified vehicle roof and comprising multiples of the swappable low voltage battery modules 340 within a frame provide additional power to extend the range of the EV. The cage structure 105 of FIG. 1 frame includes tubes from metal or composite materials, forming a cage structure fitting vehicle roof dimensions. It includes insulating materials and hard rubber seals to prevent electrical conduction to the vehicle's roof. The system incorporates cooling and safety mechanisms.

The swappable low voltage battery modules assemblies 120A-F of FIG. 1 comprise 6 of the 12 swappable low voltage battery modules assemblies wherein 6 are on each side of the vehicle and include a battery management system (BMS) 150 to monitor voltage and temperature. A main BMS 150 controls the swappable low voltage battery modules assemblies 120A-F of FIG. 1 from the left side and another six on the right side, managing cooling fans, louvers, and safety functions including impact sensors and airbag that deploy during accidents or overturns. The frame consists of long and short tubes welded together to form a cage-like structure. The tubes are covered with an insulation material, and the frame is secured to the vehicle's roof using brackets and hard rubber seals to isolate it from the vehicle.

The swappable low voltage battery modules assemble 120A-F of FIG. 1 components and comprise individual modules, with six modules on the left side of the vehicle rooftop and another six modules on the right side of the vehicle's rooftop. The swappable low voltage battery modules assemblies 120A-F of FIG. 1 components that slide into compartments within the frame and are secured by metal rails and flat metal springs, ensuring tight and secure positioning. Each of the 12 low voltage battery modules 120A-L of FIG. 5 is equipped with female and male power connectors and data in/out connectors for installation and removal.

A fire-retardant plastic cover with opening side panels encloses the metal or composite materials frame. The cover has motor-operated louvers controlled by the main BMS 150 of FIG. 1 to regulate airflow based on internal temperature and weather conditions. Metal filters at the front and side openings prevent dust and debris from entering the compartments.

Power and data connectors integrated into hard plastic plates run along the frame, linking each swappable low voltage battery module 120A-L in a series to achieve the necessary output voltage for EV operation. The main BMS 150, located at the rear of the frame, controls the overall system, including cooling, charging, and safety mechanisms.

Each swappable low voltage battery module 120A-L of FIG. 5 provides energy depending on battery cells, types, and low voltage battery modules. The total swappable low voltage battery module assembly includes 12 swappable low voltage battery modules 120A-L of FIG. 5, which delivers a total energy depending on battery cells, types, and low voltage battery modules. This extends the EV's range, depending on driving conditions. The weight of the swappable battery system is within rooftop weight limits. The total weight, including modules, frame, plastic cover, and internal components, does not exceed the rooftop weight. The swappable battery system offers a practical solution for extending the range of EVs. The entire system is controlled by a main BMS 150, which manages the charging, discharging, cooling, and safety functions of one embodiment.

FIG. 5 shows for illustrative purposes only an example of a diagram of electrical devices of a swappable battery of one embodiment. FIG. 5 shows a diagram of electrical devices of a swappable battery including a battery management system (BMS) 150 to monitor each swappable low voltage battery module 120A-L of FIG. 5. Each swappable low voltage battery module 120A-L of FIG. 5 includes its own battery management system for connection to the main BMS 150. The swappable low voltage battery module assemblies are connected in series through pyro fuse 512, high voltage high current circuit breaker 506 to DC/DC converter 510 and connected to BMS 150 of the control unit 170. BMS 150 operates a high voltage high current relay 502.

The swappable battery control unit 170 also includes a current sensor 504, and a voltage sensor 505. Control unit 170 operating variable speed fans 507 and an electrical heater 511 to warm swappable low voltage battery modules 120A-L and get signal from an impact crush sensors left 520 and right 508. The electrical heater of swappable low voltage battery modules 120A-L when used in cold weather prevent each swappable low voltage battery module 120A-L from freezing and becoming less efficient or inoperable.

The electrical devices in control unit 170 also include a pyro-fuse 512. Pyro-fuse is irreversible, cutting the current in critical situations where electrical safety is vital. Further devices in control unit 170 include a switching relay 513 to connect a charging adapter 515. Control unit 170 operating airbag device 514, front louvers operating motor 516, left side louvers operating motors 524, and getting signals from moisture sensor 518, impact sensor left 520, impact sensor right 508, top impact sensor 521, outer temperature sensor 522. Also, control unit 170 operates rear louvers operating motor 523, right side louvers operating motor 517, opening panel switch left side 526, and opening panel switch right side 525. The control unit 170 has a backing up small rechargeable battery 527. A top cover 100 of FIG. 1 is made of hard plastic fire retardant and has slots at the front and back which open and close by louvers operated by an electric motor getting a signal from the swappable battery main BMS 150 of control unit 170 according to internal temperature and outside weather conditions. The side opening panels are also made of hard plastic fire retardant and have vertical slots open and close by louvers with electrical motors operated by the swappable battery main BMS 150 of control unit 170 of one embodiment.

Figure 6:
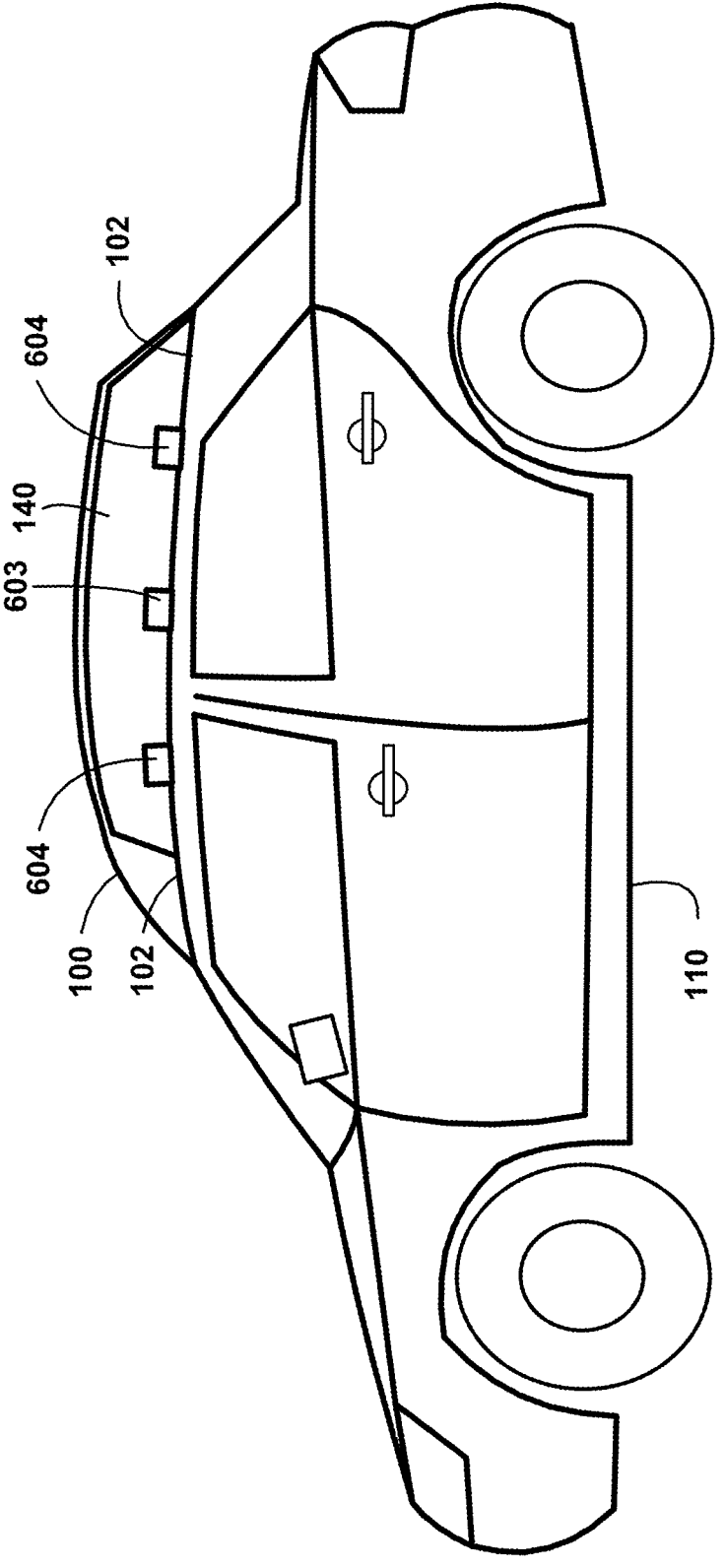
FIG. 6 shows for illustrative purposes only an example of a perspective view of the side of the EV with a rooftop swappable battery compartment of one embodiment.

FIG. 6 shows for illustrative purposes only an example of a perspective view of the side of the EV with a rooftop swappable battery compartment of one embodiment. FIG. 6 shows the electrified vehicle 110 having a plastic top cover 100 with a swappable (auxiliary battery) battery. In this view, a left-side opening side panel 140 is closed and equipped with a left-side opening panel's lock 603. The attachment to the vehicle of the plastic top cover 100 is made using brackets 604. They are attached to the frame. They are using solid rubber insulating around frame tubes and attached to the roof 102.

Figure 7:
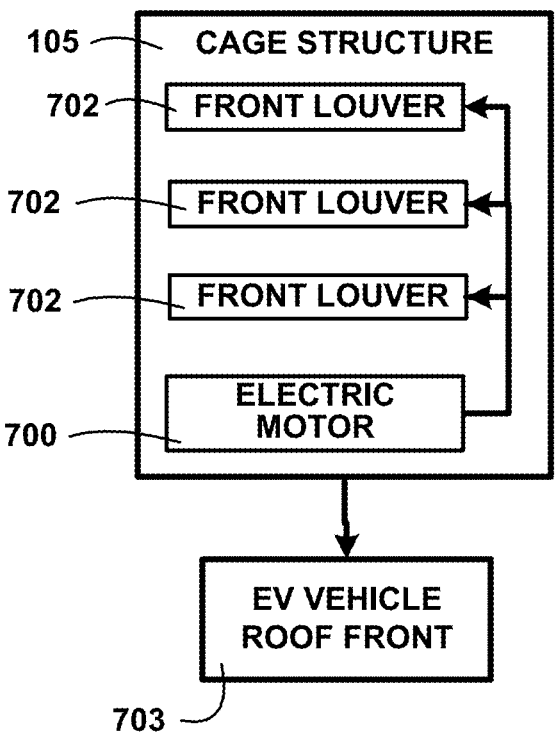
FIG. 7 shows a block diagram of an overview of the front louvers of one embodiment.

FIG. 7 shows a block diagram of an overview of the front louvers of one embodiment. FIG. 7 shows an EV roof's front 703 with front air ventilation front louvers 702 operating by electric motor 700 as part of the temperature control and adjustment system of the cage structure 105 of one embodiment.

Figure 8:
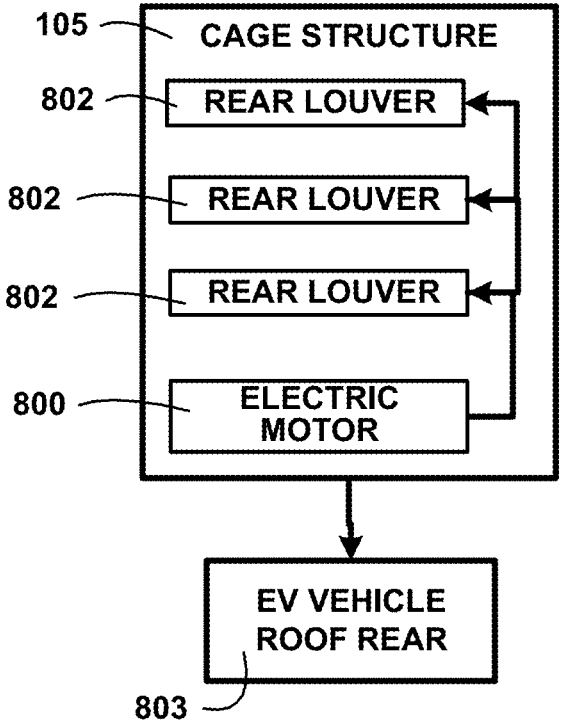
FIG. 8 shows a block diagram of an overview of the rear louvers of one embodiment.

FIG. 8 shows a block diagram of an overview of the rear louvers of one embodiment. FIG. 8 shows an EV roof's rear 803 with ventilation rear louvers 802 operating by electric motor 800 as part of the temperature control and adjustment system of cage structure 105 of one embodiment.

Figure 9:
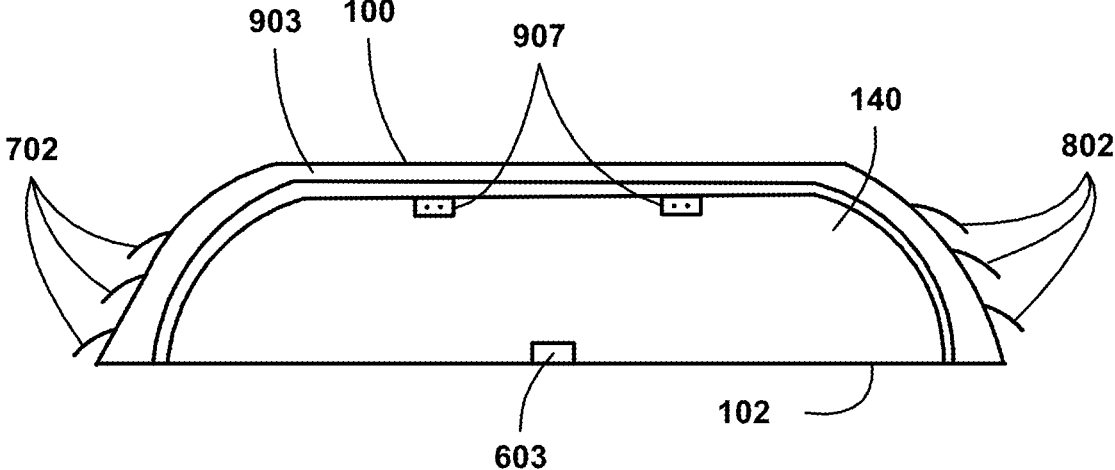
FIG. 9 shows for illustrative purposes only an example of a perspective view of the side of the rooftop cover with a swappable battery of one embodiment.

FIG. 9 shows for illustrative purposes only an example of a perspective view of the left side of the rooftop cover 100 with a swappable battery of one embodiment. The roof 102 of the EV 110 of FIG. 1. The top plastic cover with swappable (auxiliary battery) battery includes a side opening panel 140 with gutters 903, an opening panel's lock 603, and both front air ventilation louvers 702 operating by electric motor 700 of FIG. 7 and rear air ventilation louvers 802 operating by electric motor 800 of FIG. 8. The side opening panel 140 could be lifted with opening panel hinges 907 to access the swappable battery and components of one embodiment.

Figure 10:
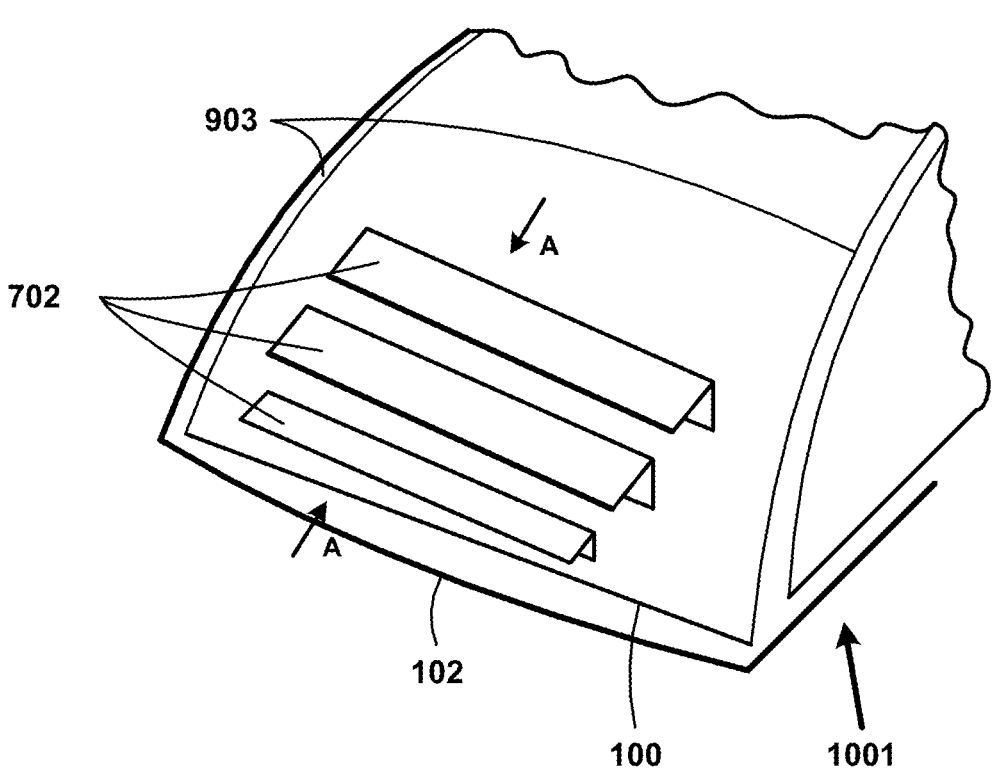
FIG. 10 shows for illustrative purposes only an example of a front view of the rooftop cover of one embodiment.

FIG. 10 shows for illustrative purposes only an example of a front view of the rooftop cover 100 of one embodiment. FIG. 10 shows a front view of the roof 102 top cover 100 of FIG. 1 and an above-the-roof view of the front parts of swappable (auxiliary) battery compartment 1001 including front air ventilation louvers 702 and top cover gutters 903. The gutter 903 diverts rain to flow along the gutter 903 toward the rear of the vehicle to prevent the water from entering the swappable battery compartment of one embodiment.

Figure 11:
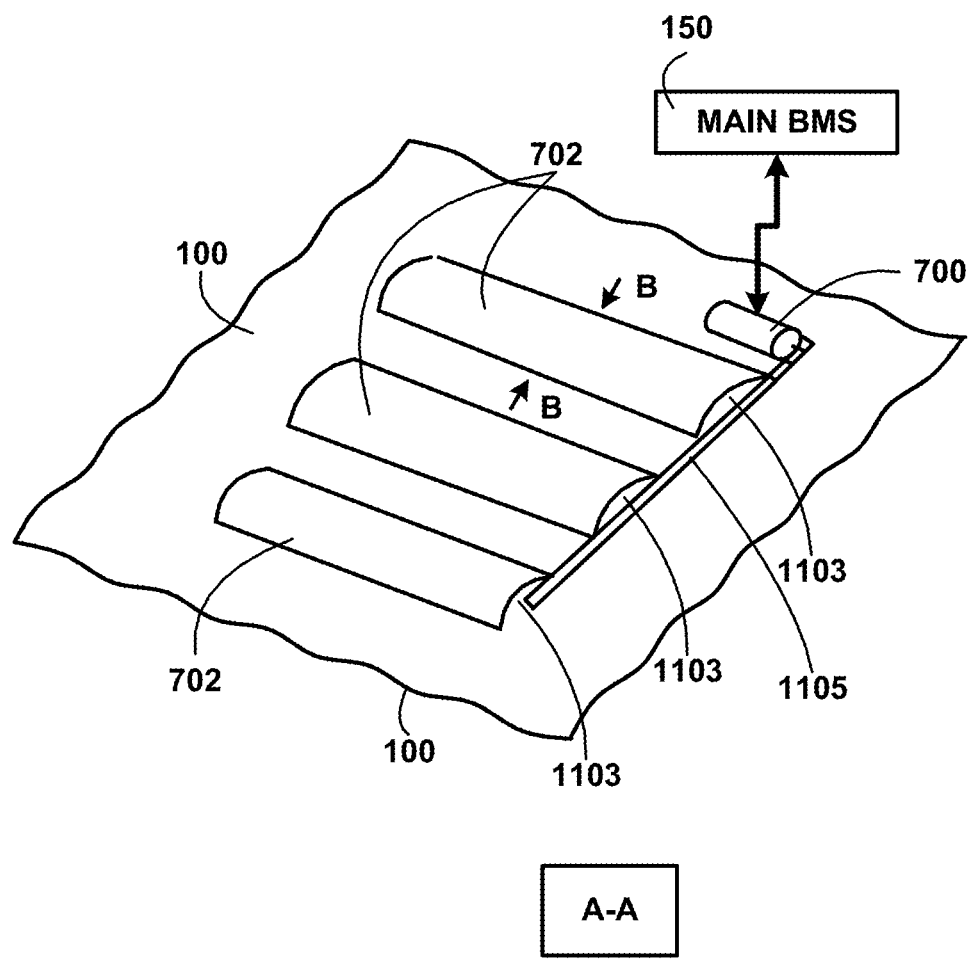
FIG. 11 shows for illustrative purposes only an example of a detailed view of a cross-section A-A from FIG. 10 of one embodiment.

FIG. 11 shows for illustrative purposes only an example of a detailed view of a cross-section A-A of FIG. 10 of one embodiment. FIG. 11 shows an above-the-roof view of the front air ventilation louvers 702, air input 1103, electric motor 700 connected to the main BMS 150, louver's driving shaft 1105, from the front part top cover 100 of one embodiment.

Figure 12:
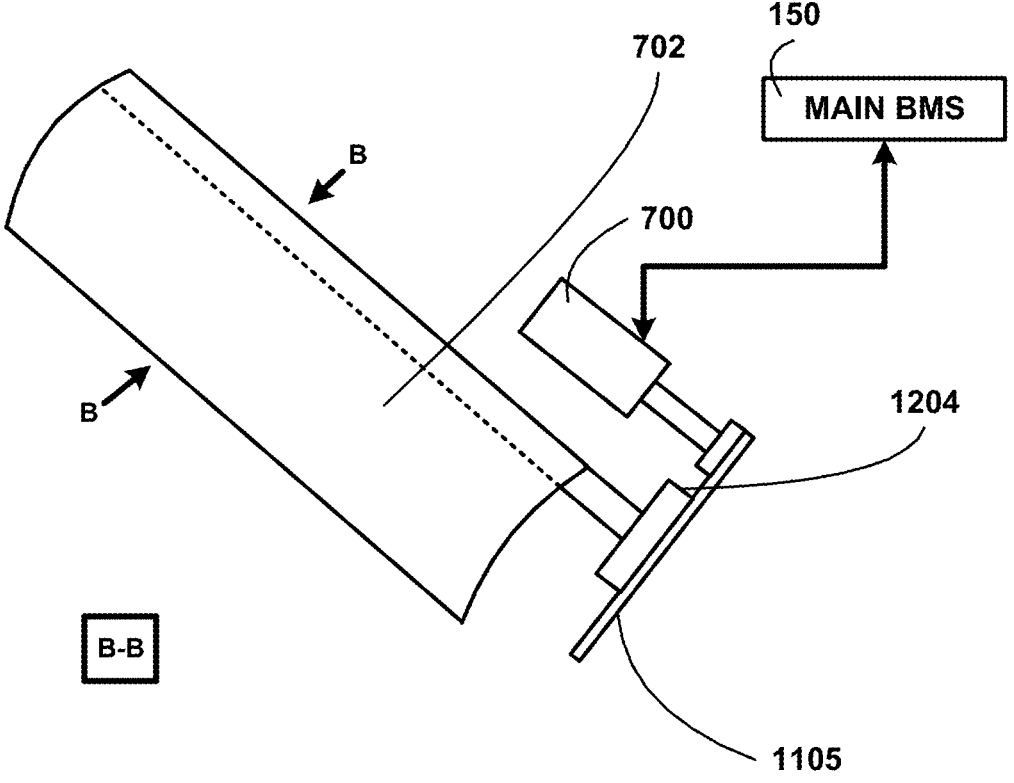
FIG. 12 shows for illustrative purposes only an example of a detailed view of a cross-section B-B of FIG. 11 of one embodiment.

FIG. 12 shows for illustrative purposes only an example of a detailed view of a cross-section B-B of FIG. 11 of one embodiment. FIG. 12 shows an image of one front air ventilation louver 702 gear 1204 used to rotate the louver to open and close. The front air ventilation louver 702 devices are incorporated in the plastic top cover 100 of FIG. 1. The main BMS 150 temperature monitoring and sending signals to the electric motor 700 to operate a gear 1204 being rotated by the louver's driving shaft 1105 coupled to the electric motor 700.

Opening the louver occurs as the louver's driving shaft 1105 rotates in one direction and to close the louver driving shaft 1105 rotates in the opposite direction. The main BMS 150 temperature monitoring and sending signals to control its rotation direction and number of revolutions to motor 700. Rotation is based on the temperature readings of one embodiment.

Figure 13:
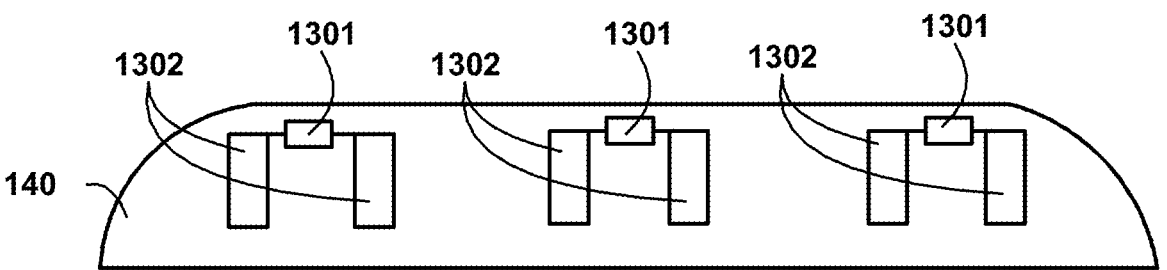
FIG. 13 shows for illustrative purposes only an example of a view of the left-side opening panel with side louvers of one embodiment.

FIG. 13 shows for illustrative purposes only an example of a view of the left-side opening panel with side louvers of one embodiment. FIG. 13 shows the left side opening side panel 140 of the cage structure including side air ventilation louvers 1302 being operated by an electric motors 1301. Upon receiving a signal from the main BMS 150 of FIG. 1 the electric motor 1301 either opens or closes the louvers partially or fully of one embodiment.

Figure 14:
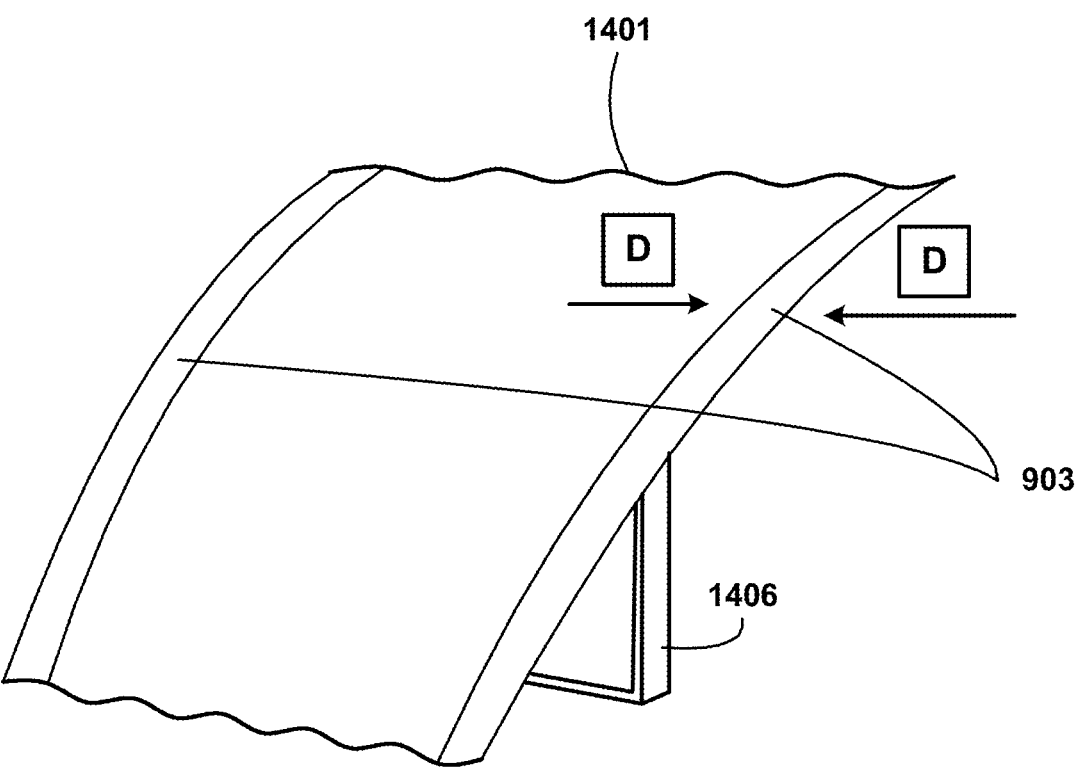
FIG. 14 shows for illustrative purposes only an example of the view of a cross-section of the front of a swappable battery cover of one embodiment.

FIG. 14 shows for illustrative purposes only an example of the view of a cross-section of the front of a swappable battery cover of one embodiment. FIG. 14 shows a section of the top of swappable (auxiliary) battery compartment 1401 including the gutters 903, and metal air filter in front 1406 of one embodiment.

Figure 15:
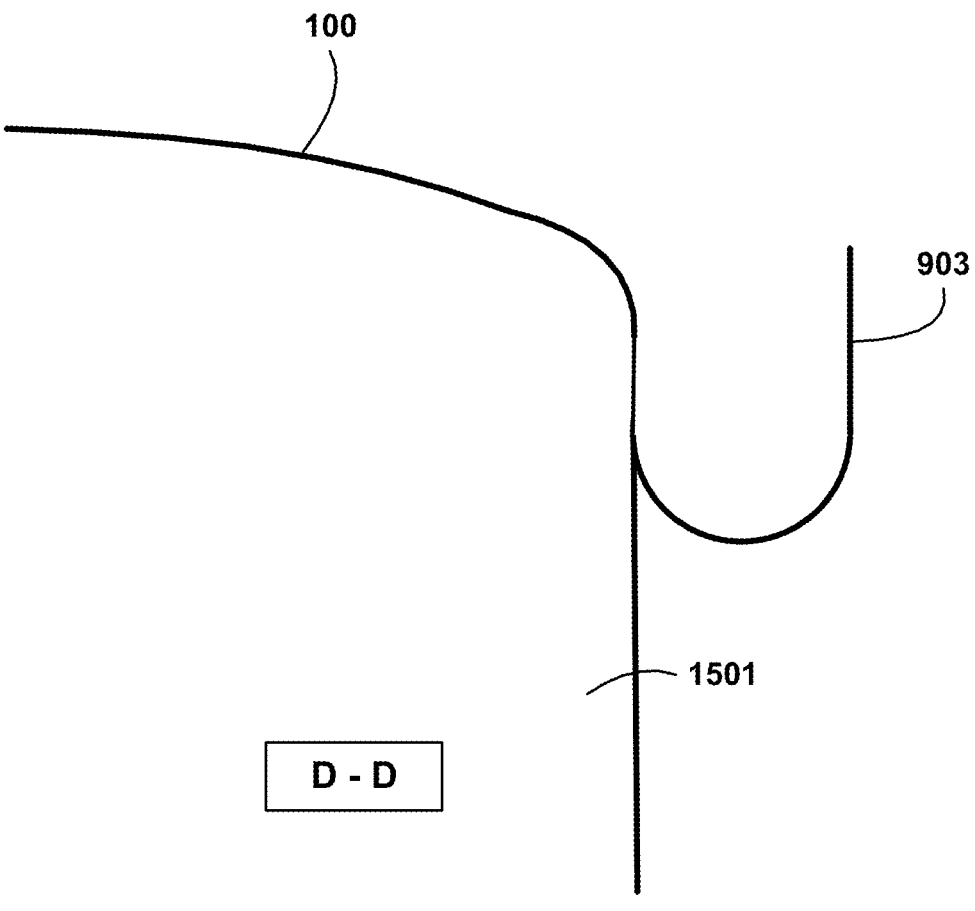
FIG. 15 shows for illustrative purposes only an example of a detailed view of a cross-section D-D from FIG. 14 of one embodiment.

FIG. 15 shows for illustrative purposes only an example of a detailed view of a cross-section D-D from FIG. 14 of one embodiment. FIG. 15 shows a front section of the top cover 100 of swappable (auxiliary) battery 1501 compartment including a gutter 903 of one embodiment.

Figure 16:
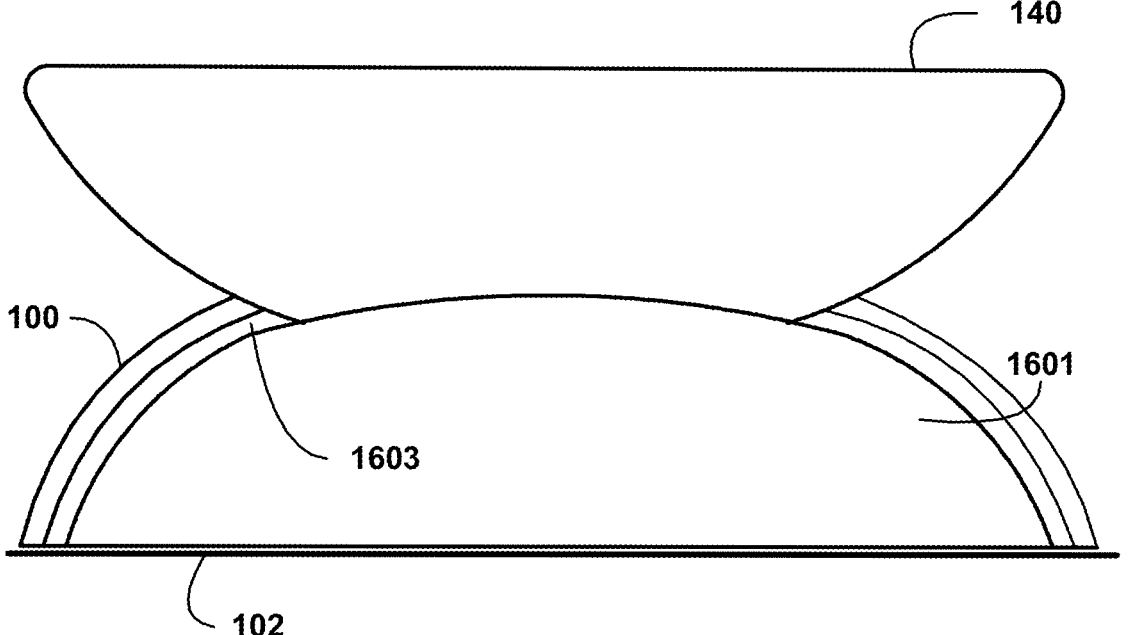
FIG. 16 shows for illustrative purposes only an example of a view of the left side of a swappable battery cover with the opening side panel opened of one embodiment.

FIG. 16 shows for illustrative purposes only an example of a view of the left side of a swappable battery cover with the opening side panel opened of one embodiment. FIG. 16 shows the left side of swappable (auxiliary) battery compartment 1601 on roof 102 with a left side opening side panel 140 in the open position and includes a rubber seal around the opening panel 1603 to provide water tightness of one embodiment. The electrified vehicle 110 of FIG. 1 with the top cover 100 and left side opening side panel 140 closed can have the left-side opening panel's lock 603 of FIG. 6 engaged and adjacent to the visible panel of one embodiment.

Figure 17:
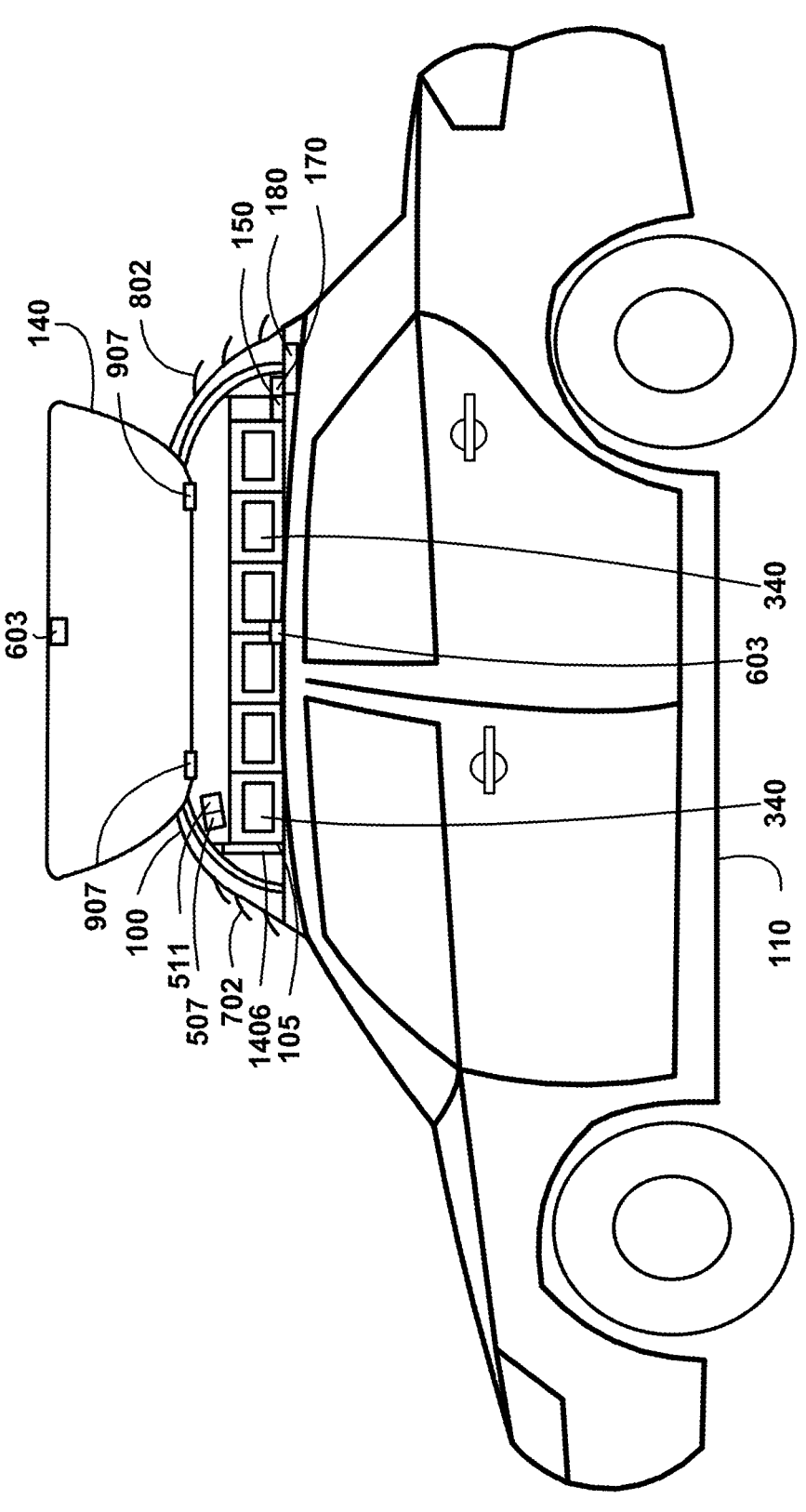
FIG. 17 shows for illustrative purposes only an example of the EV with the top swappable battery left cover opened of one embodiment.

FIG. 17 shows for illustrative purposes only an example of the EV with the top swappable battery cover opened of one embodiment. FIG. 17 shows the electrified vehicle 110 after opening panel 140 from the top cover 100. Showing the front air ventilation section with louvers 702, and power cable 180 connecting swappable battery with main power system, opening panel lock parts 603 on the frame, hinges of opening panel 907, variable speed fan 507, metal air filter in front 1406, frame 105 (cage) having swappable low voltage battery modules 340, main BMS 150, control unit 170 and other electronic devices, power cable 180 connecting swappable low voltage battery modules with main power system, and the rear air ventilation section with louvers 802 of one embodiment.

The front air ventilation louvers 702 provides airflow to cool the batteries. A variable speed fans 507 circulates warm air from the electric heaters 511 when temperatures drop. A top cover 100 includes opening panel hinges 907 that allow the opening side panel 140 to open when the opening panel's lock 603 is unlocked. The main battery management system (BMS) 150 monitors all the low voltage battery modules and connects to the EV main power system through cable 180. Other electronic devices are connected to the swappable low voltage battery module 340 units.

Figure 18:
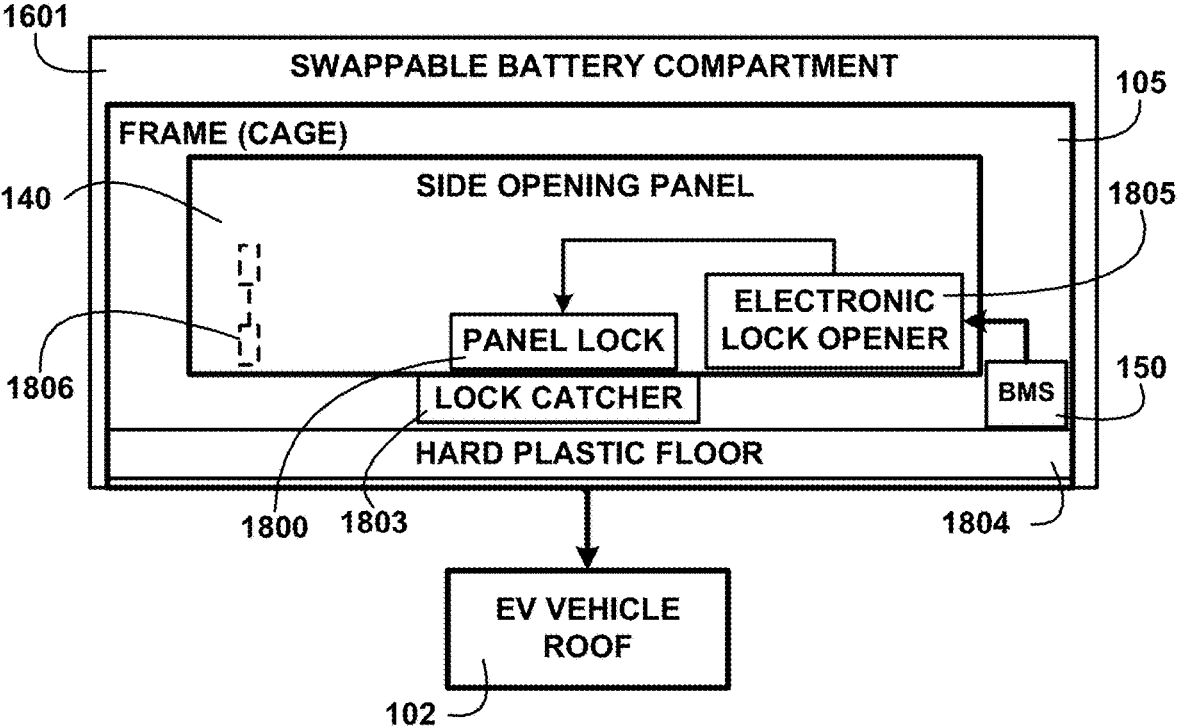
FIG. 18 shows a block diagram of an overview of the view of the left side of the opening panel's lock mechanism of one embodiment.

FIG. 18 shows a block diagram of an overview of the view of the left side of the opening panel's lock mechanism of one embodiment. FIG. 18 shows the EV roof 102 after opening the side opening panel 140 to the swappable battery compartment 1601 and the panel lock 1800 on the bottom of swappable battery opening panel 140, lock catcher 1803 on bottom floor, hard plastic floor 1804 at bottom of frame (cage) 105, electronic lock opener 1805 opened/closed by signal from the BMS 150, and shock absorbers from each side to open the panel and keep it open 1806 of one embodiment.

Figure 19:
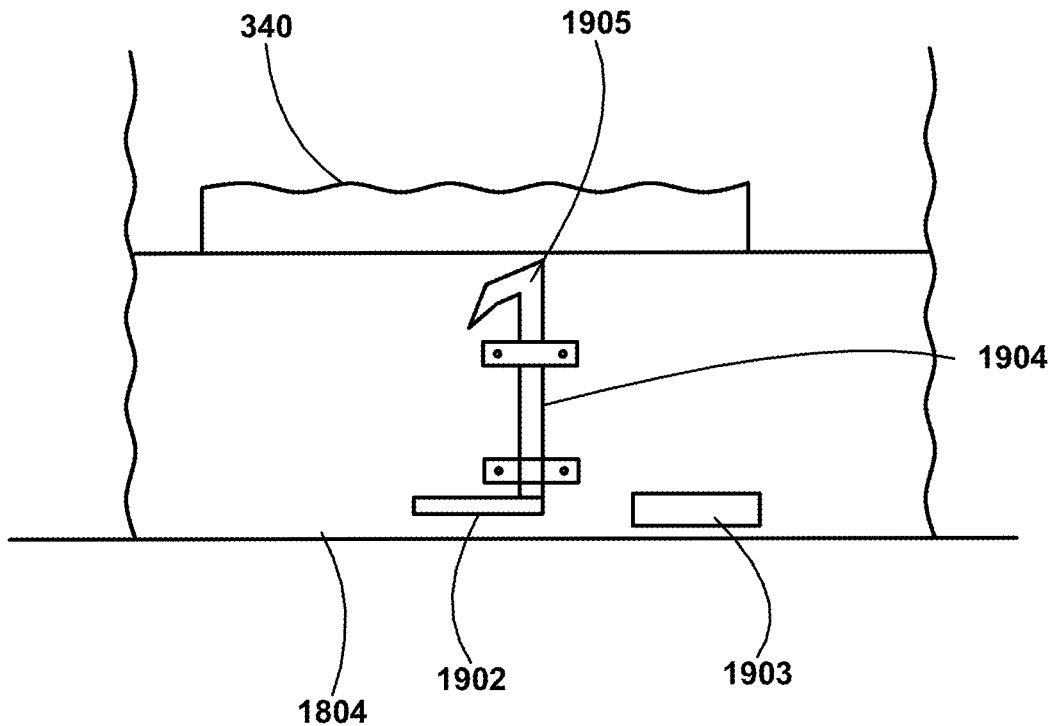
FIG. 19 shows for illustrative purposes only an example of a perspective view from the top of the low voltage battery module locking mechanism in an unlocked position of one embodiment.

FIG. 19 shows for illustrative purposes only an example of a perspective view from the top of a swappable low voltage battery module locking mechanism in an unlocked position of one embodiment. FIG. 19 shows a bottom hard plastic floor 1804 of swappable battery with a locking mechanism handle 1902. With locking mechanism shaft 1904 and locking actuator 1905 in unlocked position. Bracket 1903 locking mechanism handle 1902 of swappable low voltage battery module 340 is in an unlocked position also of one embodiment.

Figure 20:
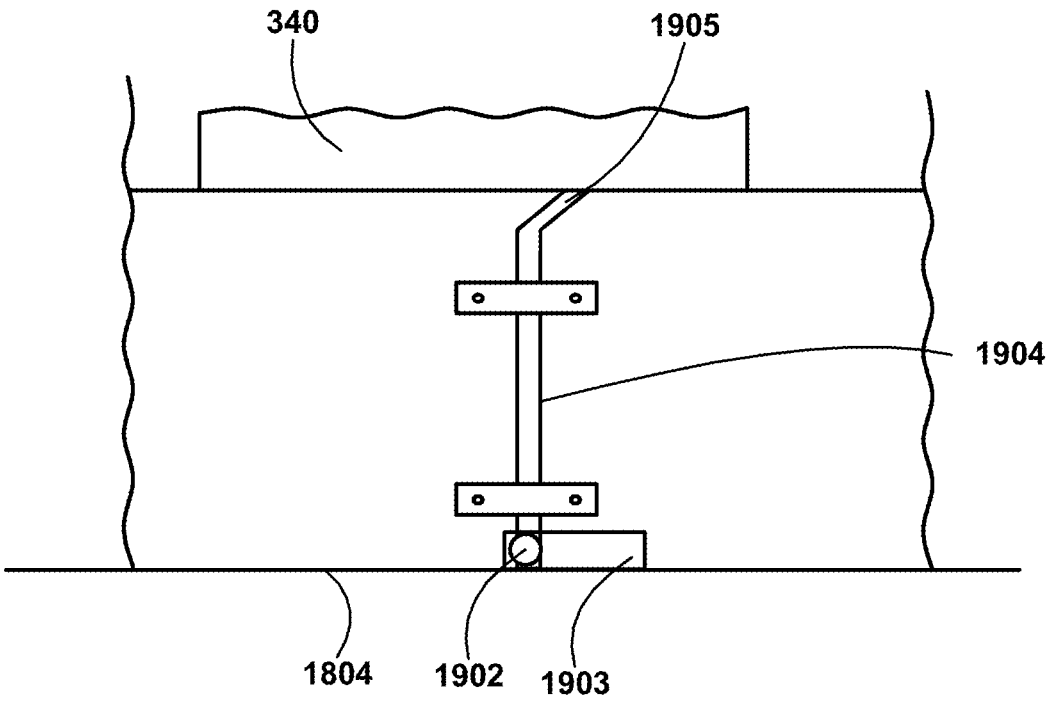
FIG. 20 shows for illustrative purposes only an example of a perspective view from the top of swappable low voltage battery module locking mechanism in locked position of one embodiment.

FIG. 20 shows for illustrative purposes only an example of a perspective view from the top of a swappable low voltage battery module locking mechanism in the locked position of one embodiment. FIG. 20 shows the bottom hard plastic floor 1804, swappable low voltage battery module 340 with the locking mechanism handle 1902. The locking and securing bracket for handle 1903 is moved into a secure position with the locking mechanism shaft 1904. The locking mechanism shaft 1904 is rotated into the clockwise locked position and the actuator 1905 into a locked position of one embodiment.

Figure 21:
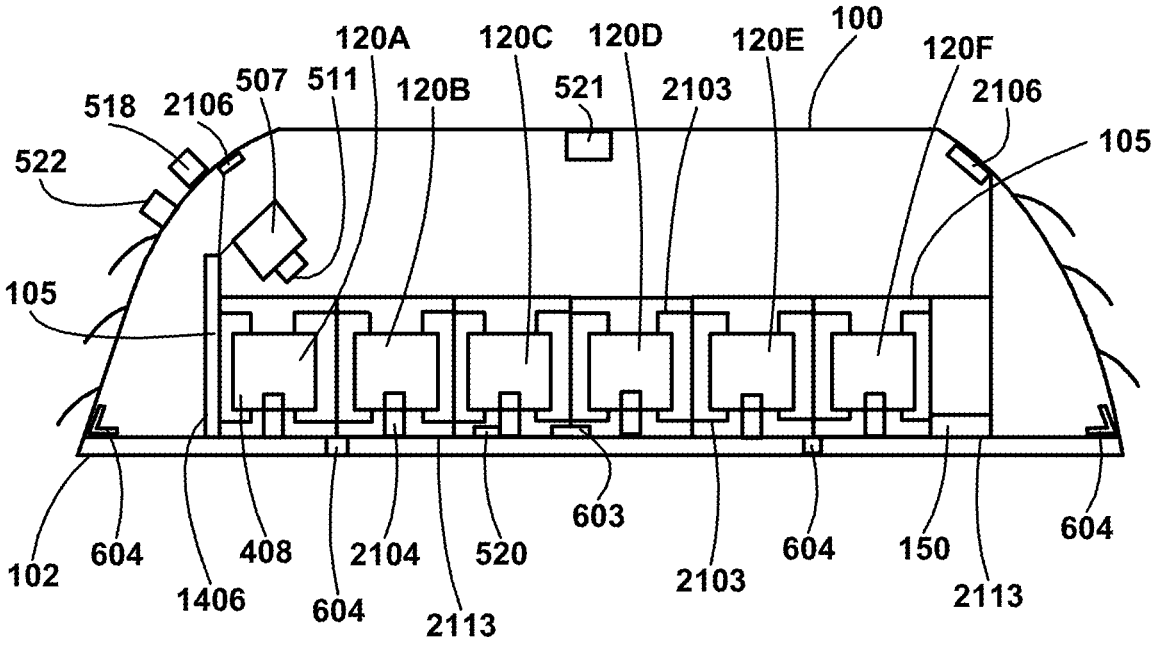
FIG. 21 shows for illustrative purposes only an example of an exploded view of the left-side internal part of the swappable battery under the top cover of one embodiment.

FIG. 21 shows for illustrative purposes only an example of an exploded view of the left-side internal part of the swappable battery under the cover of one embodiment. FIG. 21 shows metal or composite materials frame 105 (cage) surrounding low voltage battery modules 340. Held within the metal or composite materials frame is a plurality of the swappable low voltage battery modules, the roof 102 of the EV shown with swappable low voltage battery module 1 of 6 120A, swappable low voltage battery module 2 of 6 120B, swappable low voltage battery module 3 of 6 120C, swappable low voltage battery module 4 of 6 120D, swappable low voltage battery module 5 of 6 120E and swappable low voltage battery module 6 of 6 120F.

Wherein the metal or composite materials frame 105 holds the plurality of the swappable low voltage battery modules 340 in place while the EV is in motion. The metal or composite materials frame includes metal rails 2103 guiding and supporting swappable low voltage battery modules and a lock mechanism 2104 for each swappable low voltage battery module 340. Also showing brackets holding the top cover on frame (cage) 2106, main battery management system module 150. A moisture sensor 518 detects humidity and moisture entering from the outside and an outside temperature sensor 522 measures the temperature of the air entering the compartment to activate the temperature controls to prevent the batteries from overheating.

A metal filter in front 1406 is used to intercept any debris entering the compartment from the outside through the louvers. Also showing is the vehicle roof 102, of EV. Brackets 604 holding top cover 100 on frame (cage) 105. Within the compartment are the variable speed fan 507, top impact sensor 521, left side impact sensor 520, and brackets 604 connecting and securing the frame (cage) 105 to the vehicle roof. A main BMS 150 is located near the bottom of the compartment where is the bracket for holding the bottom to the top covers.

The bottom plate of the unit (floor) with small borders 2113. A fire retardant hard plastic plate attached to the bottom of the frame forming a floor of the frame structure and having outward borders for safety insulation from the vehicle. An electric heater 511 to warm up batteries is mounted above the plurality of the swappable low voltage battery modules 340. An opening panel switch is activated when the panel is opened to alert the driver or passenger that the panel is not securely locked in one embodiment.

Figure 22:
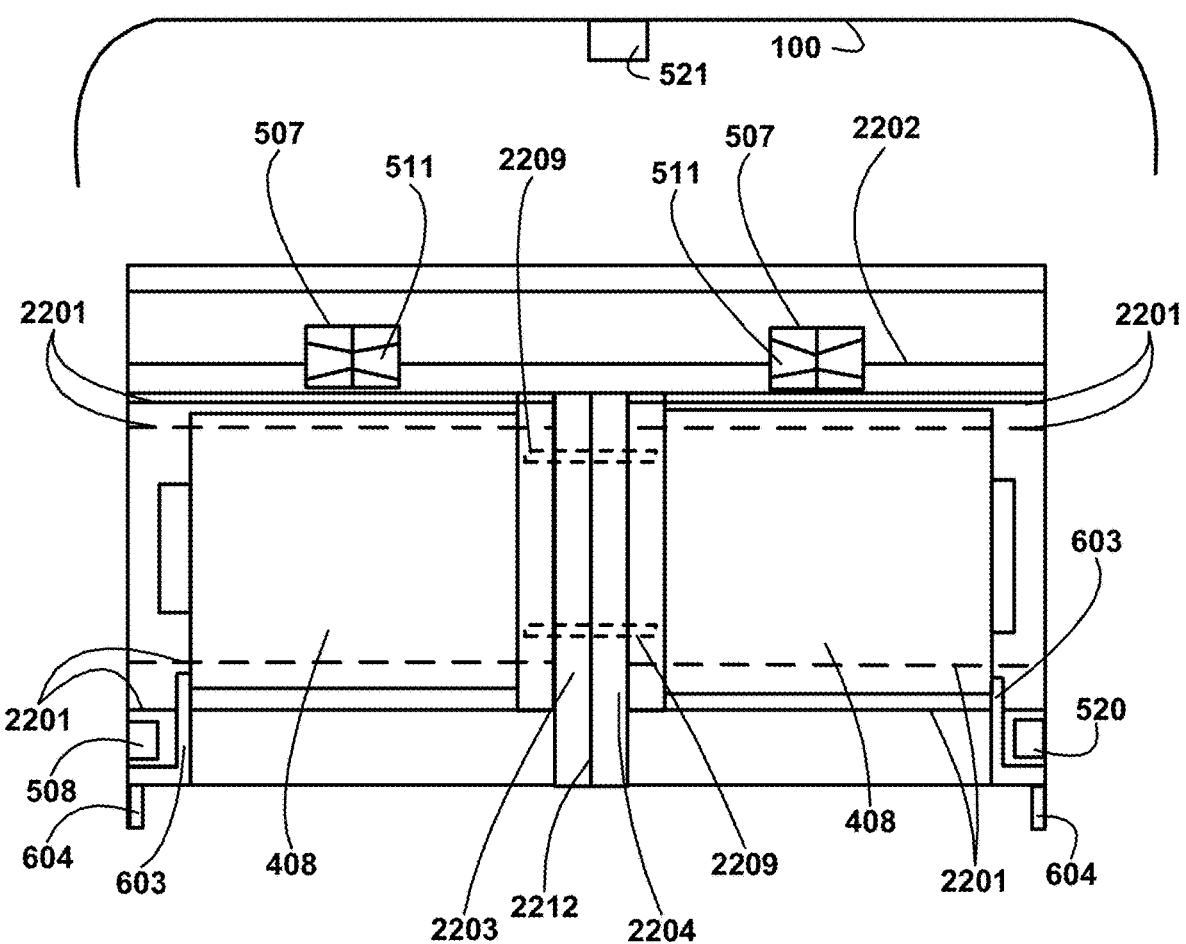
FIG. 22 shows for illustrative purposes only an example of an exploded view of the front internal part of the swappable battery under the top cover of one embodiment.

FIG. 22 shows for illustrative purposes only an example of an exploded view of the front internal part of the swappable battery under the top cover of one embodiment. FIG. 22 shows the rails for guiding and holding the low voltage battery module in the installed position 2201 to safely secure the swappable low voltage battery module 340 in place. Hard plastic 2202 plate for supporting fans 507, heaters 511, left side 2204 and right side 2203 plates with electric cables and connectors are secured to the middle vertical of frame 2212 and separate the low voltage battery modules from the left and right side and are electrically connected to flow electrical current to the main BMS 150 of FIG. 1 for use in operating the EV. Brackets 604 of FIG. 6 attach the frame (cage) 105 of FIG. 1 and top cover 100 of FIG. 1 to the vehicle roof 102 of FIG. 1 which creates an integrated structure to maintain a secure position of the batteries and other devices. Also shown is the variable speed fan 507 with electric heater 511, wherein the fan can operate without heat to cool the batteries, and with the heating, operation circulates to prevent freezing and maintain proper electrical power being supplied.

A left and right-side impact sensor detects any, for example, collisions on the sides. The top impact sensor 521 of FIG. 5 detects any force being applied upon the top of the compartment. Seen is at least one bolt 2209 securing the hard plastic plates to middle vertical tube 2212 and a left and right-side impact sensor 520, and 508 for detection of left and right-side collisions, in one instance. A lock mechanism 603 of FIG. 6 for swappable low voltage battery module 340 secures each low voltage battery module to the metal or composite materials frame of one embodiment.

Figure 23:
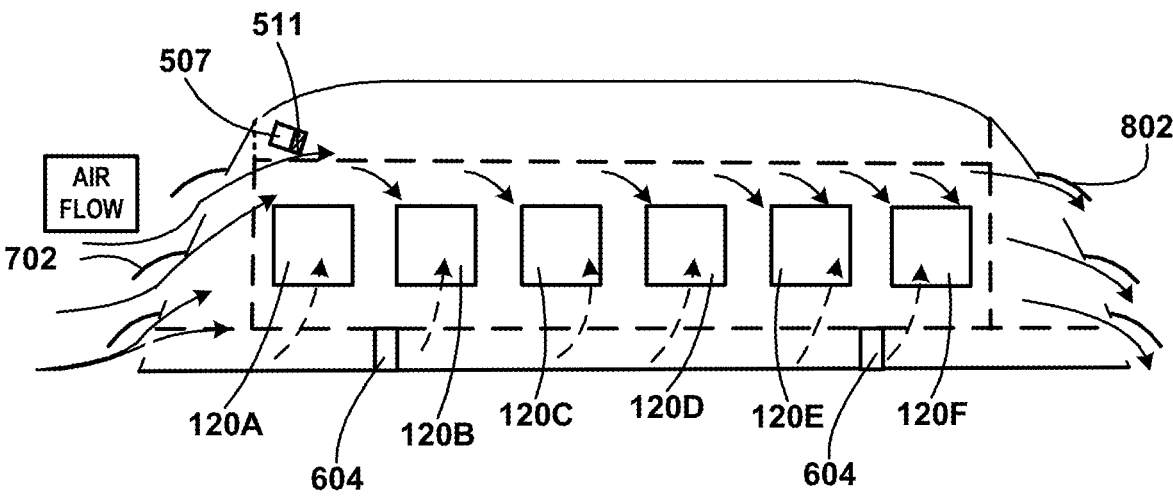
FIG. 23 shows for illustrative purposes only an example of a view of a diagram of air distribution under a battery cover of one embodiment.

FIG. 23 shows for illustrative purposes only an example of a view of a diagram of air distribution under a battery cover of one embodiment. FIG. 23 shows a variable speed fan 507 and heater 511 to direct airflow around each swappable low voltage battery module while the vehicle is in motion and even when it is parked or stopped. The airflow passes through front louvers 702 to swappable low voltage battery module assembly 1 of 6 120A, swappable low voltage battery modules assembly 2 of 6 120B, swappable low voltage battery module assembly 3 of 6 120C, swappable low voltage battery module assembly 4 of 6 120D, swappable low voltage battery module assembly 5 of 6 120E, and swappable low voltage battery module assembly 6 of 6 120F cooling the low voltage battery modules. For the low voltage battery modules on the left side are similar air flow applied to the right side of swappable battery.

A swappable (auxiliary battery) battery BMS 150 of FIG. 1 powers at least one electric heater 511 to warm the swappable low voltage battery modules 340 of FIG. 4 when used in cold weather preventing the low voltage battery modules from freezing and becoming less efficient or inoperable. An electrified vehicle 110 of FIG. 1 with front air ventilation louvers 702 operating by electric motor 700 of FIG. 7 as part of the temperature control and adjustment system. To prevent bumping damage to the batteries solid rubber insulating around the frame's tubes and brackets 604 reduces the impact force. A low voltage battery module provides power to rear air ventilation louvers 802 operating by an electrical motor of a swappable (auxiliary) battery compartment as part of the temperature control and adjustment system of one embodiment.

Figure 24:
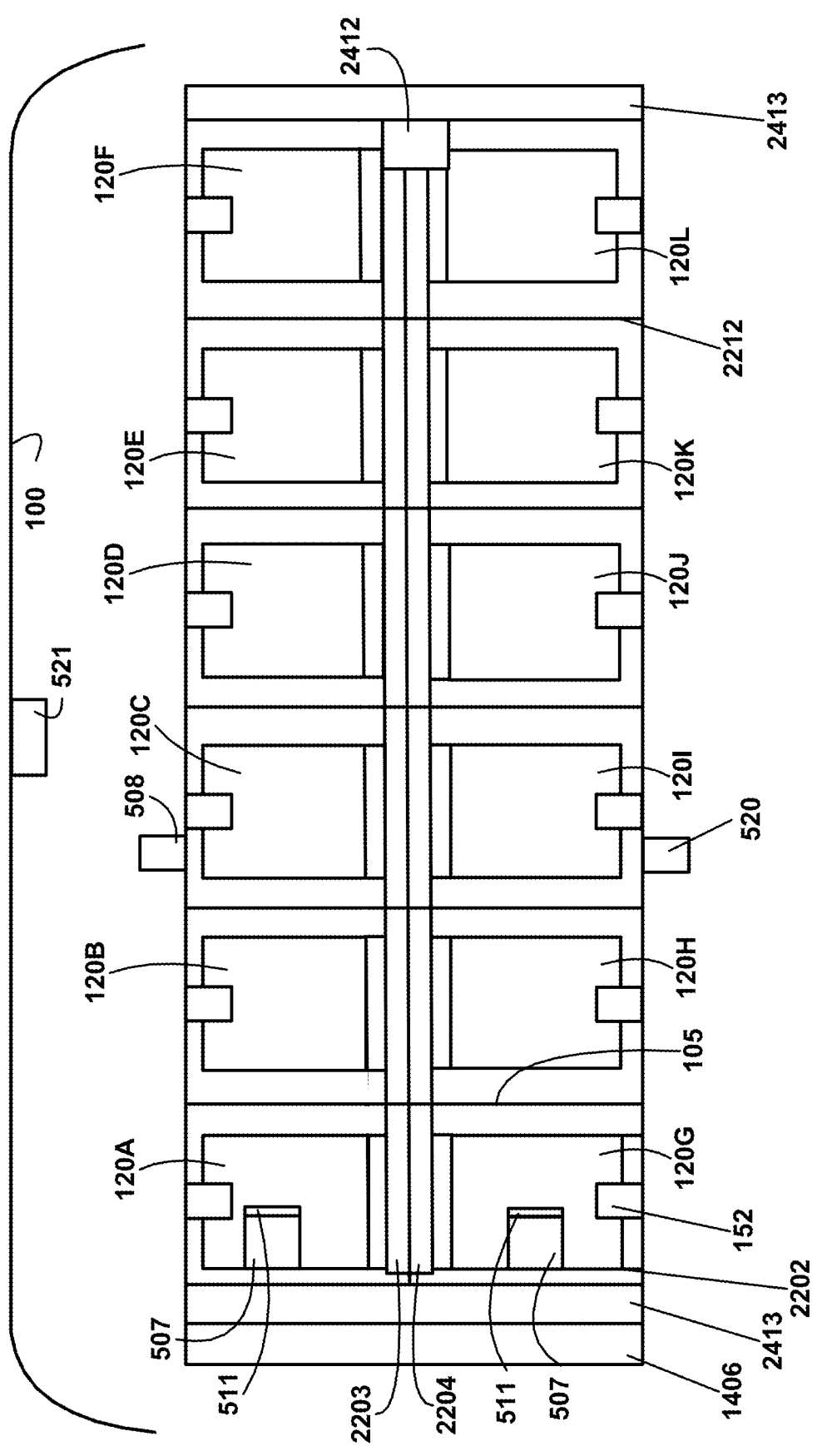
FIG. 24 shows for illustrative purposes only an example of an exploded internal view of the swappable battery from the top under the cover of one embodiment.

FIG. 24 shows for illustrative purposes only an example of an exploded internal view of the swappable battery from the top under the cover of one embodiment. FIG. 24 shows a metal air filter attached to the front of the swappable low voltage battery module. Showing is each of the swappable low voltage battery module assembly 1 of 12 120A, swappable low voltage battery module assembly 2 of 12 120B, swappable low voltage battery module assembly 3 of 12 120C, swappable low voltage battery module assembly 4 of 12 120D, swappable low voltage battery module assembly 5 of 12 120E, swappable low voltage battery module assembly 6 of 12 120F, swappable low voltage battery module assembly 7 of 12 120G, swappable low voltage battery module assembly 8 of 12 120H, swappable low voltage battery module assembly 9 of 12 120I, swappable low voltage battery module assembly 10 of 12 120J, swappable low voltage battery module assembly 11 of 12 120K, and swappable low voltage battery module assembly 12 of 12 120L.

A low voltage battery module lock mechanism 2104 prevents the swappable low voltage battery module from moving while stationed in the metal or composite materials frame (cage) 105. In the frame or adjacent to the frame is shown a variable speed fan 507 with electric heaters 511 on plate 2202, left side hard plastic plate with electric cables and connectors 2204, left side impact sensor 520, right side impact sensor 508, top impact sensor 521, rear panel 2413 connecting to cover and the front panel 2413 connecting to cover, right side hard plastic plate 2203, and metal or composite materials frame 2212 surrounding low voltage battery modules, electrical heater 511 to warm low voltage battery modules, top cover 100 surrounding low voltage battery modules, a metal-air filter in front 1406, and airbag 2412, deployed in collision events to provide additional protection to the low voltage battery modules and reduce any possible movement of the low voltage battery modules in the metal or composite materials frame (cage) 105 of one embodiment.

Figure 25:
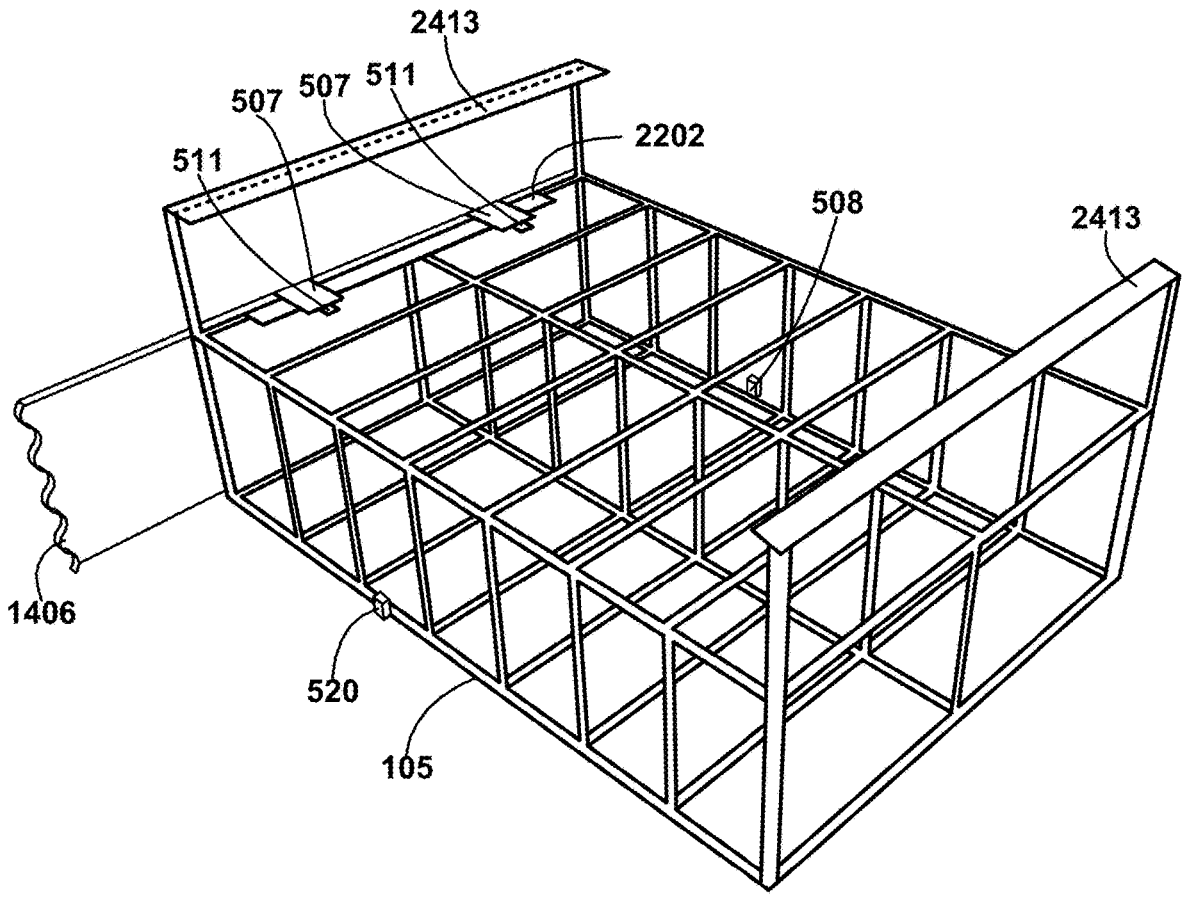
FIG. 25 shows for illustrative purposes only an example of a perspective view of a metal or composite materials frame of the swappable battery of one embodiment.

FIG. 25 shows for illustrative purposes only an example of a perspective view of a metal or composite materials frame of the swappable battery of one embodiment. FIG. 25 shows the metal or composite materials frame (cage) 105 having a rear panel 2413 and front panel 2413 attached and holding top cover 100 of FIG. 1. Also showing is a left-side impact sensor 520 and a right-side impact sensor 508. A hard plastic 2202 provides support for the electrical heaters 511 and variable speed fans 507. The panels attaching the cage to the top cover are angled to match the curve of the top cover. The electrical heater 511 warms low voltage battery modules using the variable speed fans 507 to disperse the heat in the cage. The metal-air filter in front 1406 filters out airborne debris that could enter the cage of one embodiment.

Figure 26:
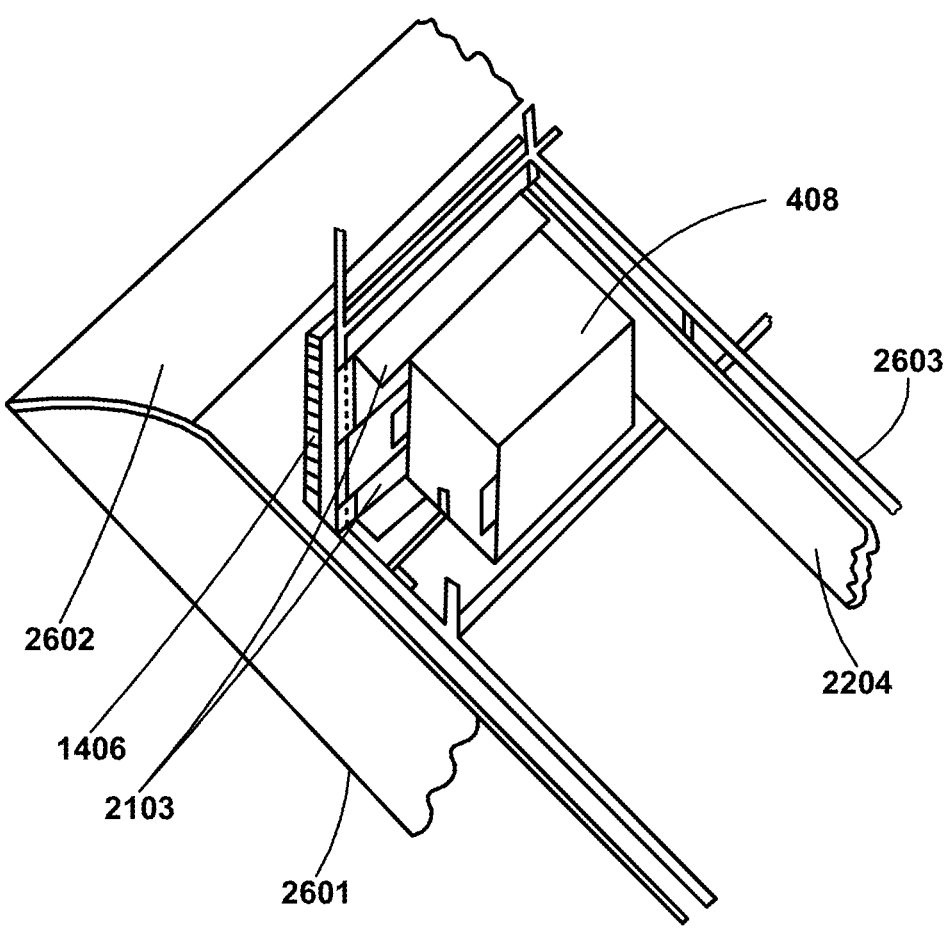
FIG. 26 shows for illustrative purposes only an example of an exploded view of the disposition of the low voltage battery module inside of module compartment of frame of one embodiment.

FIG. 26 shows for illustrative purposes only an example of an exploded view of the disposition of the low voltage battery module inside of the module compartment of the frame of one embodiment. FIG. 26 shows the left side window glass of vehicle 2601, windshield of the vehicle 2602, and part of the frame (cage) 2603. The metal or composite materials frame includes rails guiding and supporting swappable low voltage battery modules 340. Coupled to the middle part of the frame (cage) 2603 is a left-side hard plastic plate 2204 for connectors, electric cables, and wires. Also shown is a swappable low voltage battery module 340 on the metal or composite materials frame including rails 2103 guiding and supporting swappable low voltage battery modules 340.

A metal air filter in front 1406 filters out particulates that are airborne to prevent incoming debris. To prevent movement of the swappable low voltage battery module 340 a lock for each low voltage battery module is used to hold the module in place. A hard plastic plate 2204 containing all connectors, electric cables, and wires connected to main BMS 150 of FIG. 1 and is separated from the frame by a thin plastic plate for additional insulation between the left hard plastic plate 2204 and frame of one embodiment.

Figure 27:
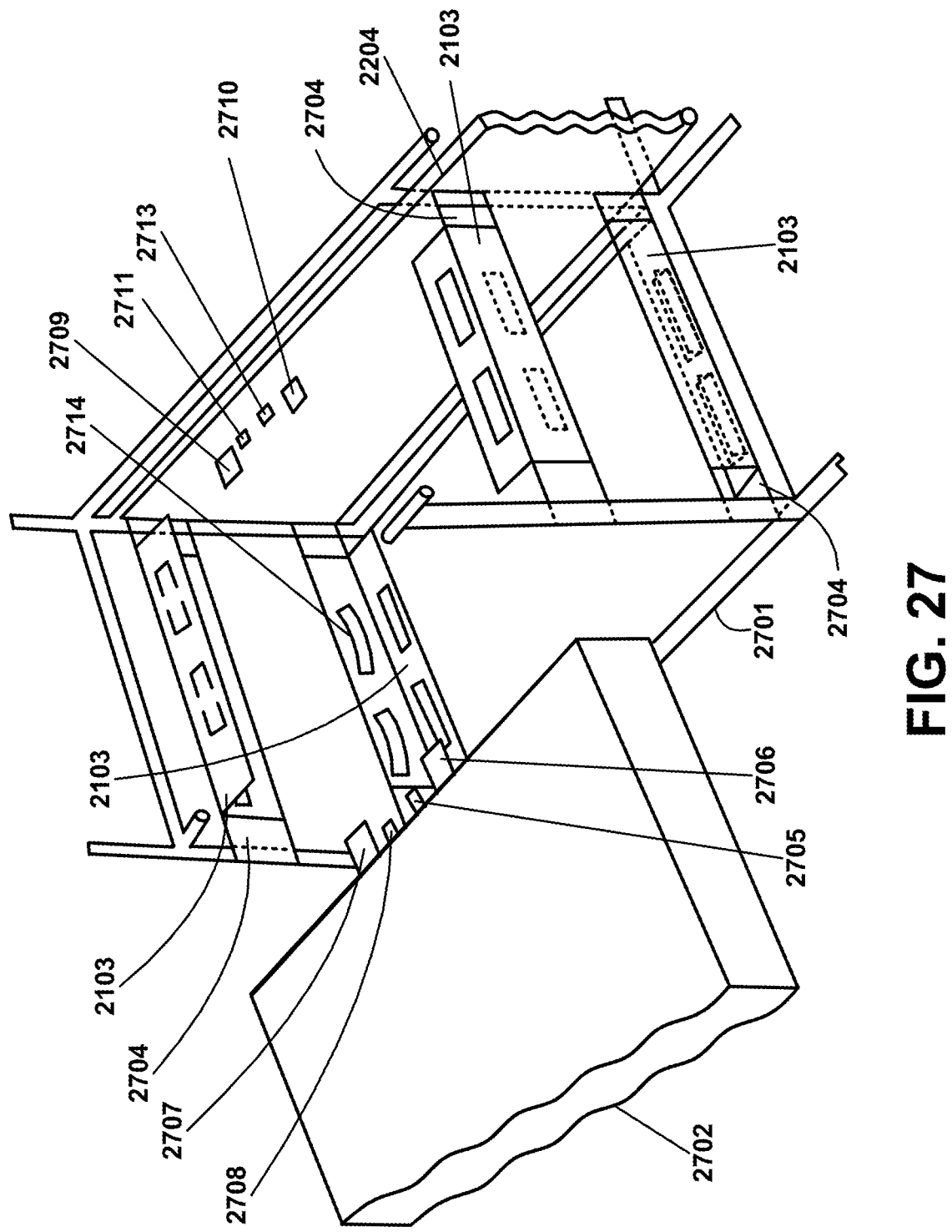
FIG. 27 shows for illustrative purposes only an example of an exploded view of the low voltage battery module compartment with guiding rails of one embodiment.

FIG. 27 shows for illustrative purposes only an example of an exploded view of the low voltage battery module compartment with guiding rails of one embodiment. FIG. 27 shows a part of the frame (cage) 2701 and a part of low voltage battery module 2702 not secured in the cage. The rails guiding and securing low voltage battery module in place with a hard plastic plate for rails 2704. Shown is a left side hard plastic plate holding connections cables and wires.

Showing is an RCA or similar type data input connector to low voltage battery module 2705, negative power female connector 2706, positive power female connector 2707, RCA type data outer connector from low voltage battery module 2708, positive male power connector 2709, negative male power connector 2710 for connecting to the low voltage battery module 2702 when secured in the cage. An RCA-type male data in connector 2711 to swappable battery main BMS using the hard plastic plate for all connections and electrical cables 2204. Also showing is an RCA-type male data outer connector from the main BMS to low voltage battery module 2713. On the rails are flat metal springs 2714 of one embodiment.

Figure 28:
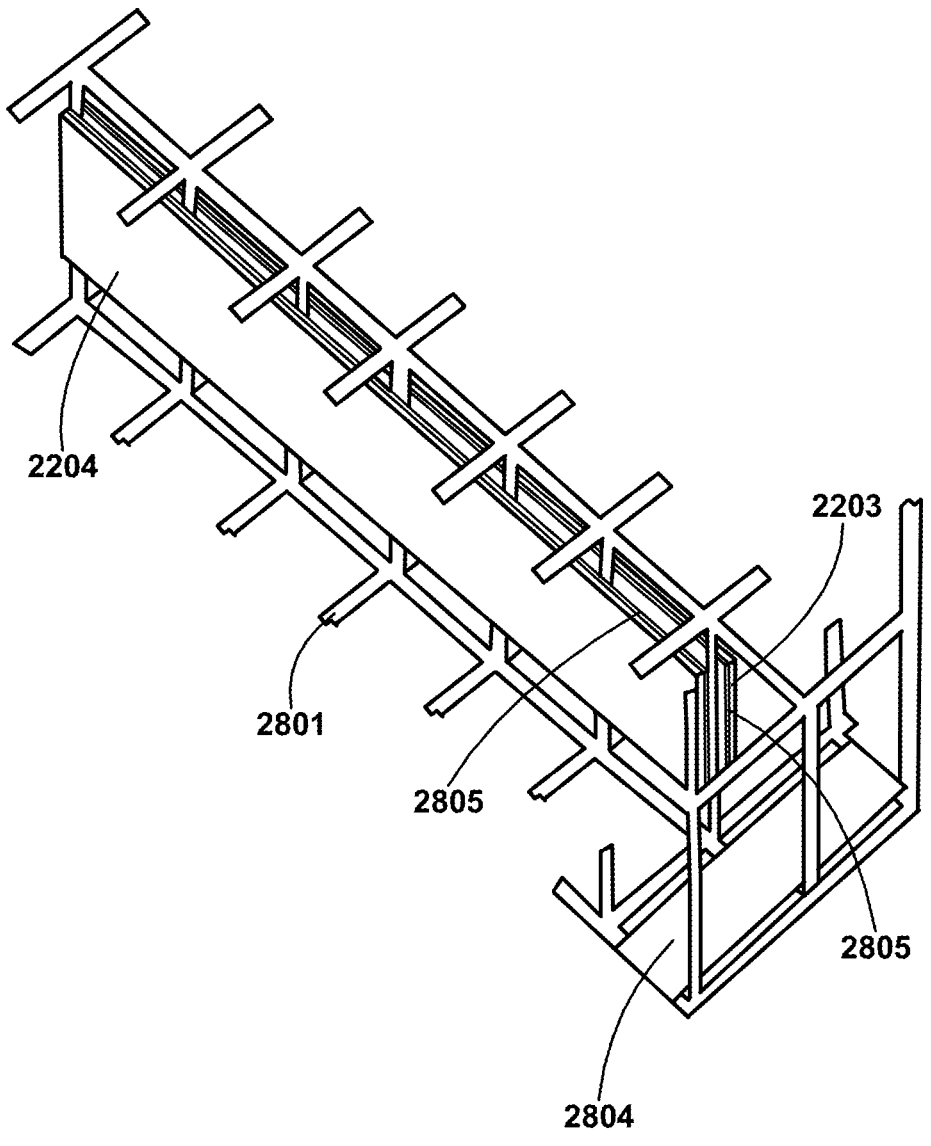
FIG. 28 shows for illustrative purposes only an example of an exploded view of the middle section of the frame with hard plastic plate of one embodiment.

FIG. 28 shows for illustrative purposes only an example of an exploded view of the middle section of the frame with hard plastic plates of one embodiment. FIG. 28 shows the middle part of the frame (cage) 2801. Coupled to the middle part of the frame (cage) 2801 is a left-side hard plastic plate for connectors, electric cables, and wires 2204. Coupled to the middle part of the frame (cage) 2801 is a right-side hard plastic plate for connectors, electric cables, and wires 2203.

Hard plastic plates are separated from the frame by a thin plastic plate 2805 from each side providing additional insulation between the frame and the left and right plastic plate of one embodiment. Also showing plate containing the main BMS and other electronics 2804 separated from the other hard plastic plate of one embodiment.

Figure 29:
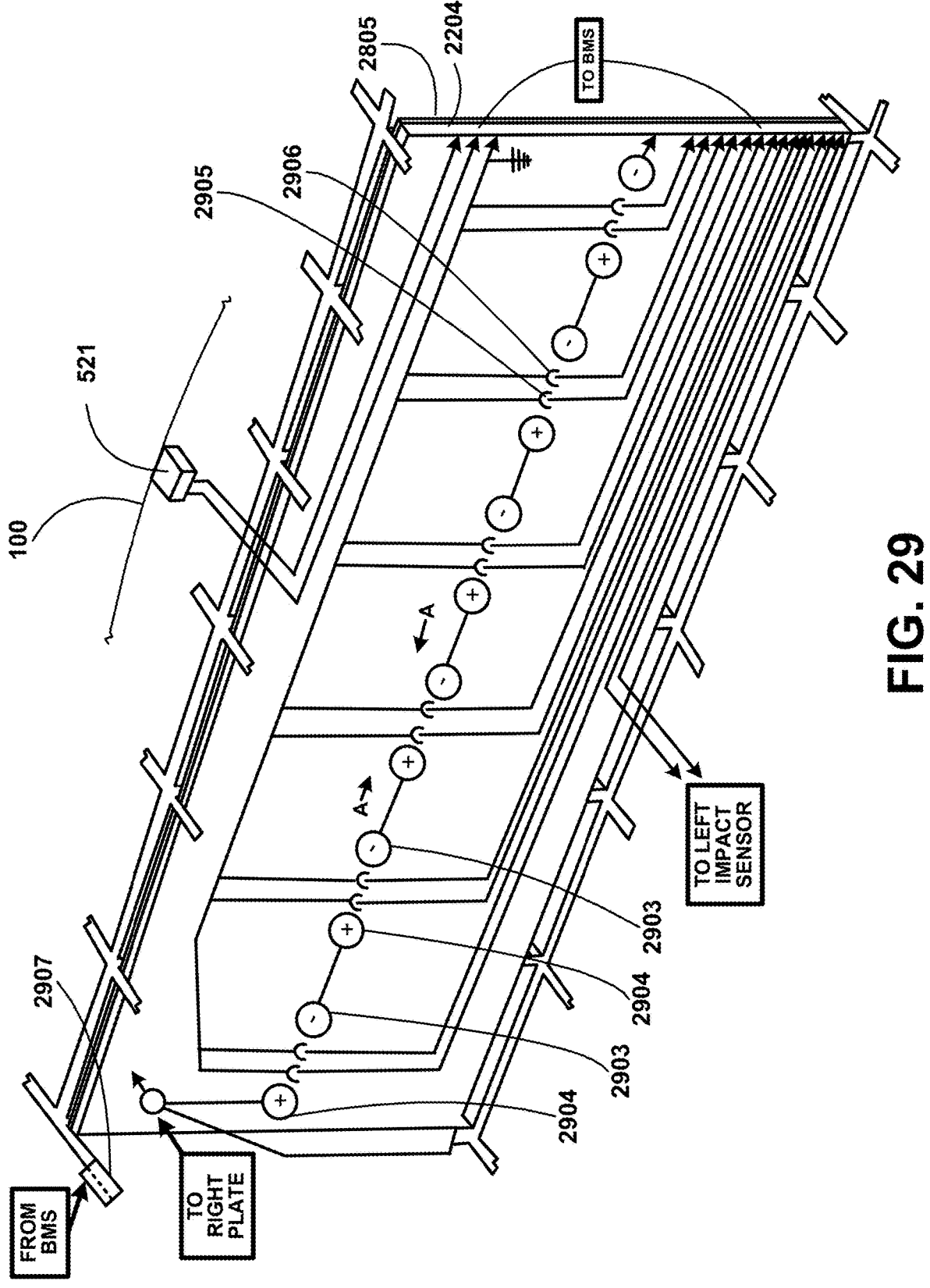
FIG. 29 shows for illustrative purposes only an example of an exploded view of the left-side middle part of the frame with a left hard plastic plate and connectors of one embodiment.

FIG. 29 shows for illustrative purposes only an example of an exploded view of the left-side middle part of the frame with a left hard plastic plate and connectors of one embodiment. FIG. 29 shows a thin plastic insulation plate 2805 between the left hard plastic plate and the frame's tubes. The left side hard plastic plate 2204 has connectors, electric cables, and wires. The left side hard plastic plate 2204 has RCA type data input male connector 2905 and RCA type outer data male connector 2906 from the main BMS. They are connected accordingly to the RCA outer data connector like 2708 of FIG. 27 and the RCA input data connector like 2705 of FIG. 27.

A negative male high voltage and current power connector 2903 and a positive male high voltage and current power connector 2904 from left hard plastic plate 2204 are connected accordingly to the negative female power connector of low voltage battery module 2706 of FIG. 27 and positive female power connector like 2707 of FIG. 27.

The positive and negative circuits are seen on the hard plastic plates. Also shown is a left-side combination variable speed electric fan with electric heater 2907 and the top impact sensor 521 near the top cover 100. The circuit connects from the left plate, and the left impact sensor, to and from BMS 150 of FIG. 1 devices of one embodiment.

Figure 30:
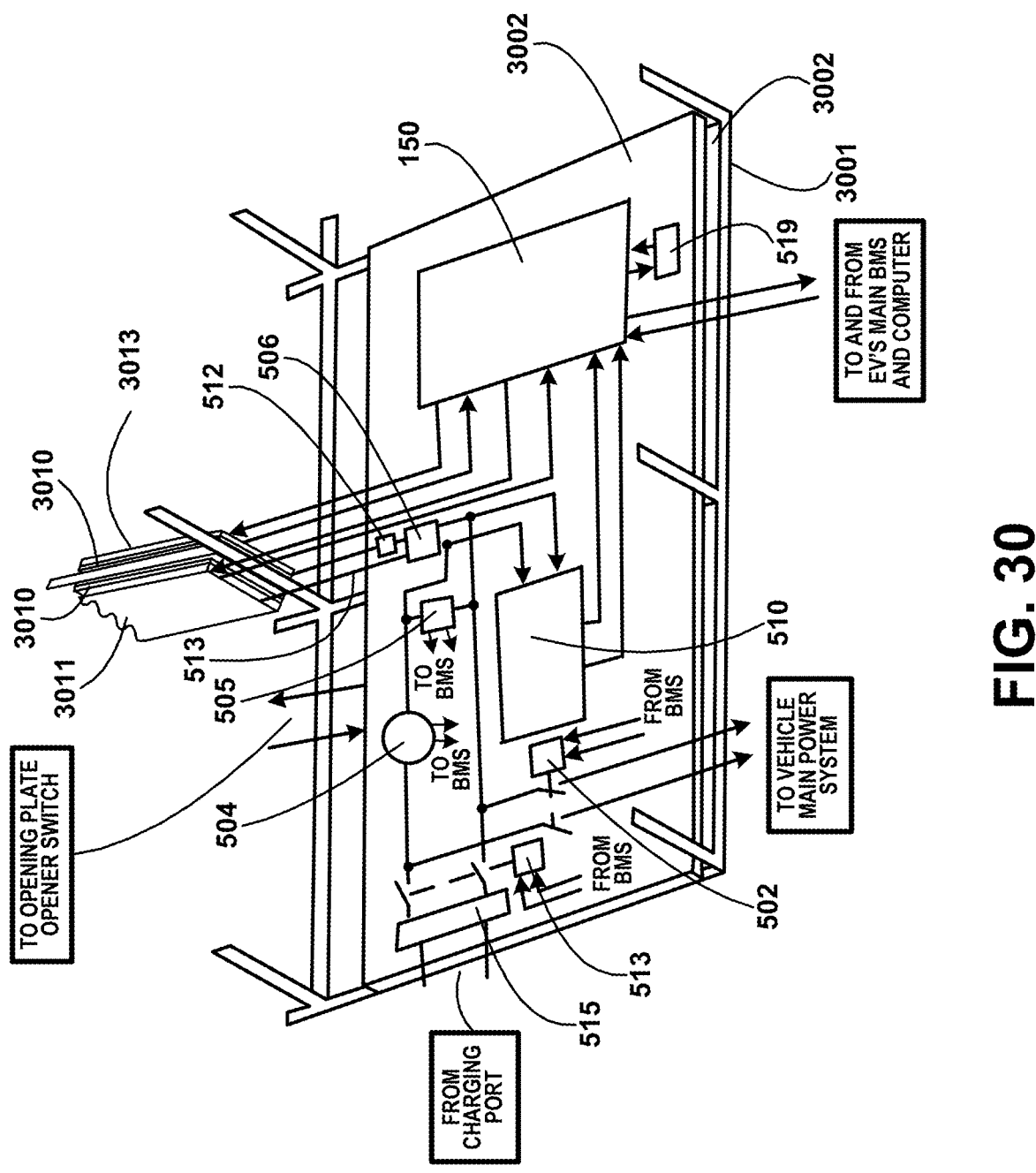
FIG. 30 shows for illustrative purposes only an example of a perspective view of the last rear section of the swappable battery of one embodiment.

FIG. 30 shows for illustrative purposes only an example of a perspective view of the last rear section of the swappable battery of one embodiment. FIG. 30 shows the rear part of the frame (cage) 3001, hard plastic plate 3002, main BMS 150, DC/DC converter 510, voltage sensor 505, current sensor 504, high voltage high current relay 502, high voltage high current circuit breaker 506, part of left side hard plastic plate 3011 with connectors and electric cables, thin plastic insulation plate 3010, right side hard plastic plate 3013 with connectors and electric cables, right side thin plastic plate 3010, high voltage high current relay for connecting charging adapter 513, charging adapter 515, pyro-fuse 512, backing up small rechargeable battery 519 of one embodiment.

Figure 31:
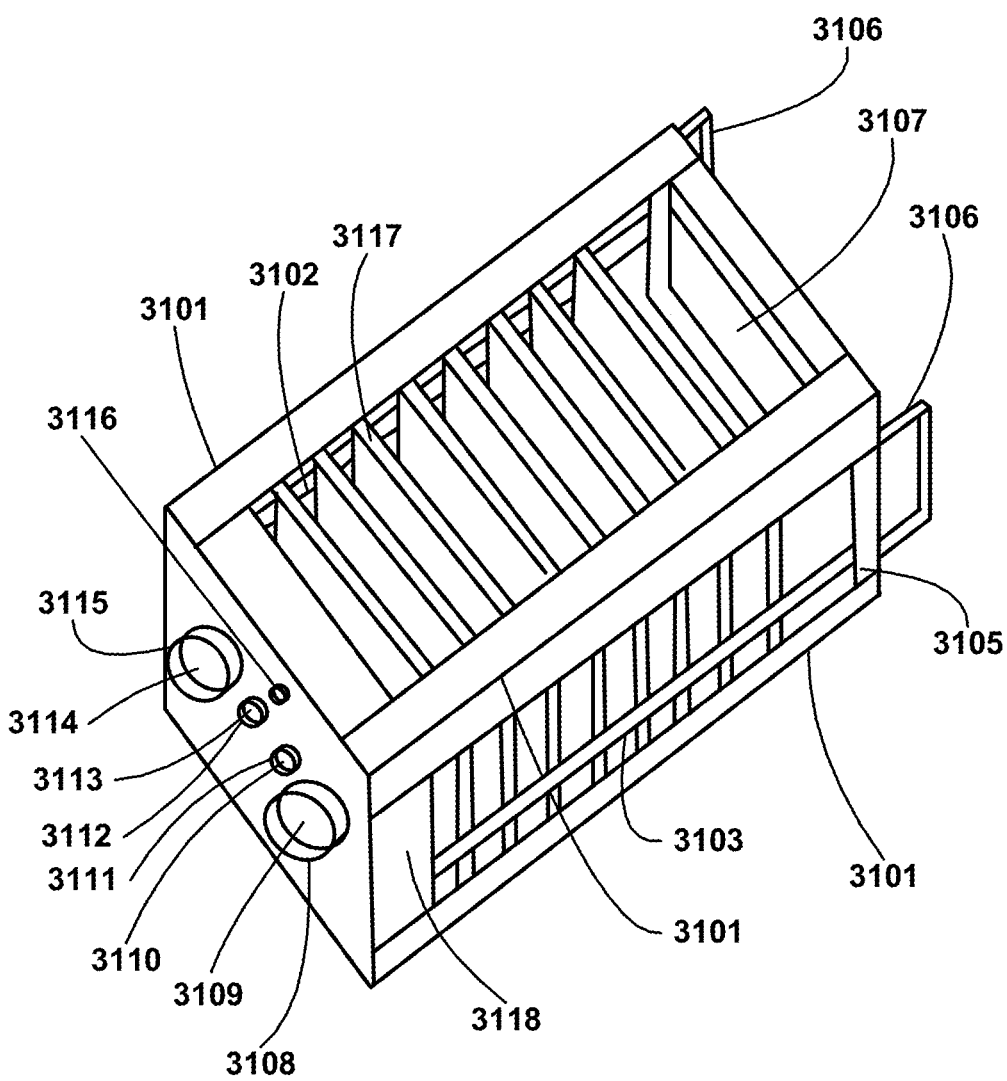
FIG. 31 shows for illustrative purposes only an example of an exploded view of the low voltage battery module of one embodiment.

FIG. 31 shows for illustrative purposes only an example of an exploded view of the low voltage battery module of one embodiment. FIG. 31 shows an outer frame side part (aluminum or light metal angle plate) 3101, module BMS 3118, left side cable, wire channel guide 3102, right side cable, wire channel guide 3103, back plate 3105, handle 3106, the open middle section of back plate 3107, flexible plastic guide/seal for positive power terminal of low voltage battery module 3108, positive female power terminal (connector) 3109, RCA type female outer data terminal (connector) of low voltage battery module 3110, flexible plastic guide/seal for outer data terminal (connector) 3111, flexible plastic guide/seal for input data terminal (connector) 3112, RCA type female input data terminal (connector) 3113, negative female power terminal (connector) 3114, flexible plastic guide/seal for negative power terminal of low voltage battery module 3115, switch on/off of low voltage battery module 3116, and battery cells row 3117 of one embodiment.

Figure 32:
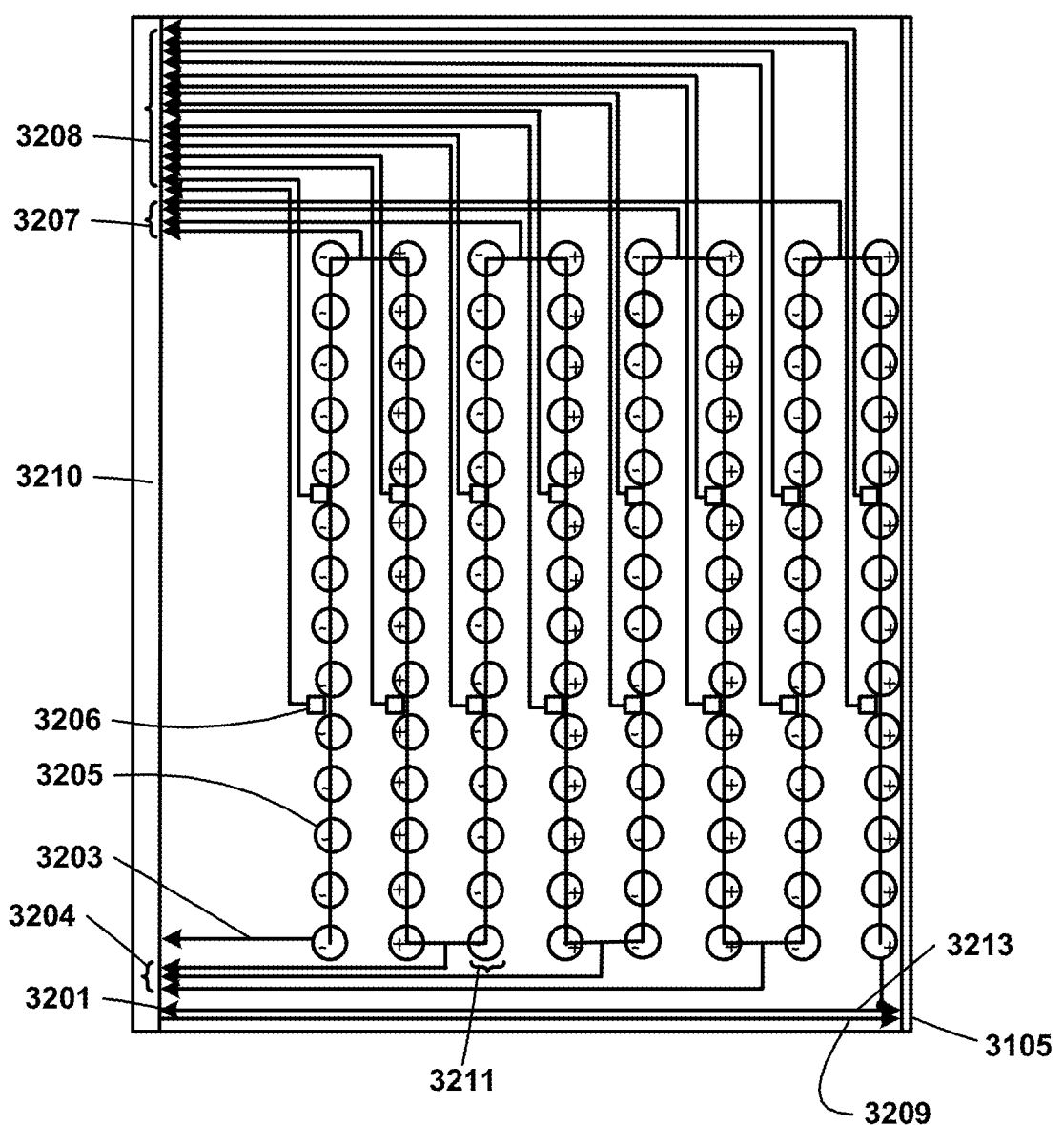
FIG. 32 shows for illustrative purposes only an example of a view of an electric diagram of the low voltage battery module of one embodiment.

FIG. 32 shows for illustrative purposes only an example of a view of an electric diagram of the low voltage battery module of one embodiment. FIG. 32 shows a negative power cable 3201, positive power cable 3203, low voltage battery module right side voltage data wires 3204, negative cells terminal 3205, temperature sensors 3206, low voltage battery module left side voltage data wires 3207, temperature sensors wires 3208, data positive wire for charging state indicator lights on back panel from the front of low voltage battery module BMS 3209, BMS of low voltage battery module 3210, low voltage battery module cells row 3211, back plate 3105, and data negative wire from the last battery cells row for charging state indicator lights on back panel 3213 of one embodiment.

Figure 33:
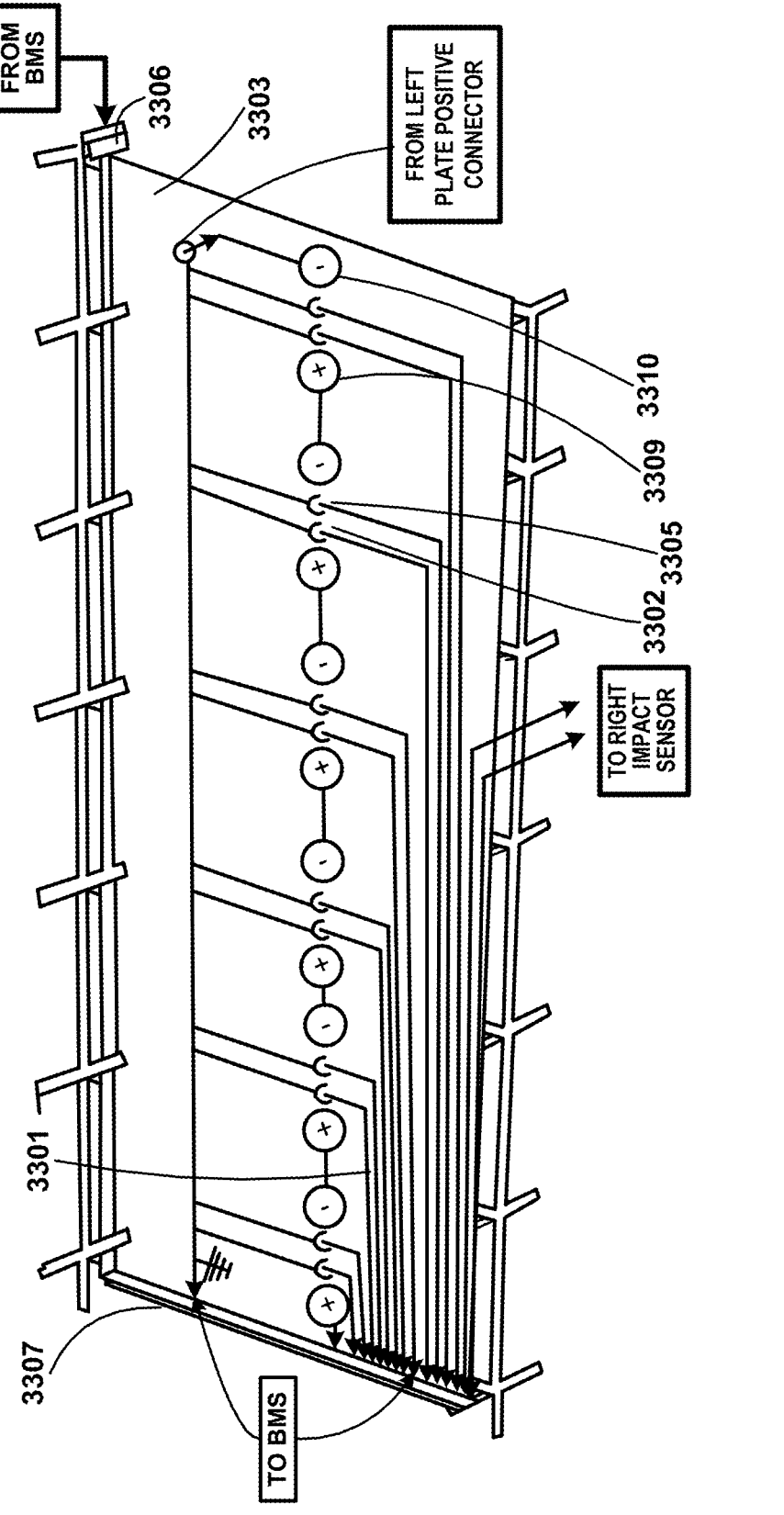
FIG. 33 shows for illustrative purposes only an example of a perspective view of the right-side middle part of the frame with the right plate and connectors of one embodiment.

FIG. 33 shows for illustrative purposes only an example of a perspective view of the right-side middle part of the frame with the right plate and connectors of one embodiment. FIG. 33 shows the right side hard plastic plate 3303 with connectors, electric cables, and wires 3301 having an RCA type male connector of input data from low voltage battery module 3302, negative male power connector 3310, positive male power connector 3309, RCA type male connector of outer data from main BMS 3305, and right-side combination of variable speed electric fan with heater 3306. Also shown is a right-side thin plate for insulation 3307 of one embodiment.

Figure 34:
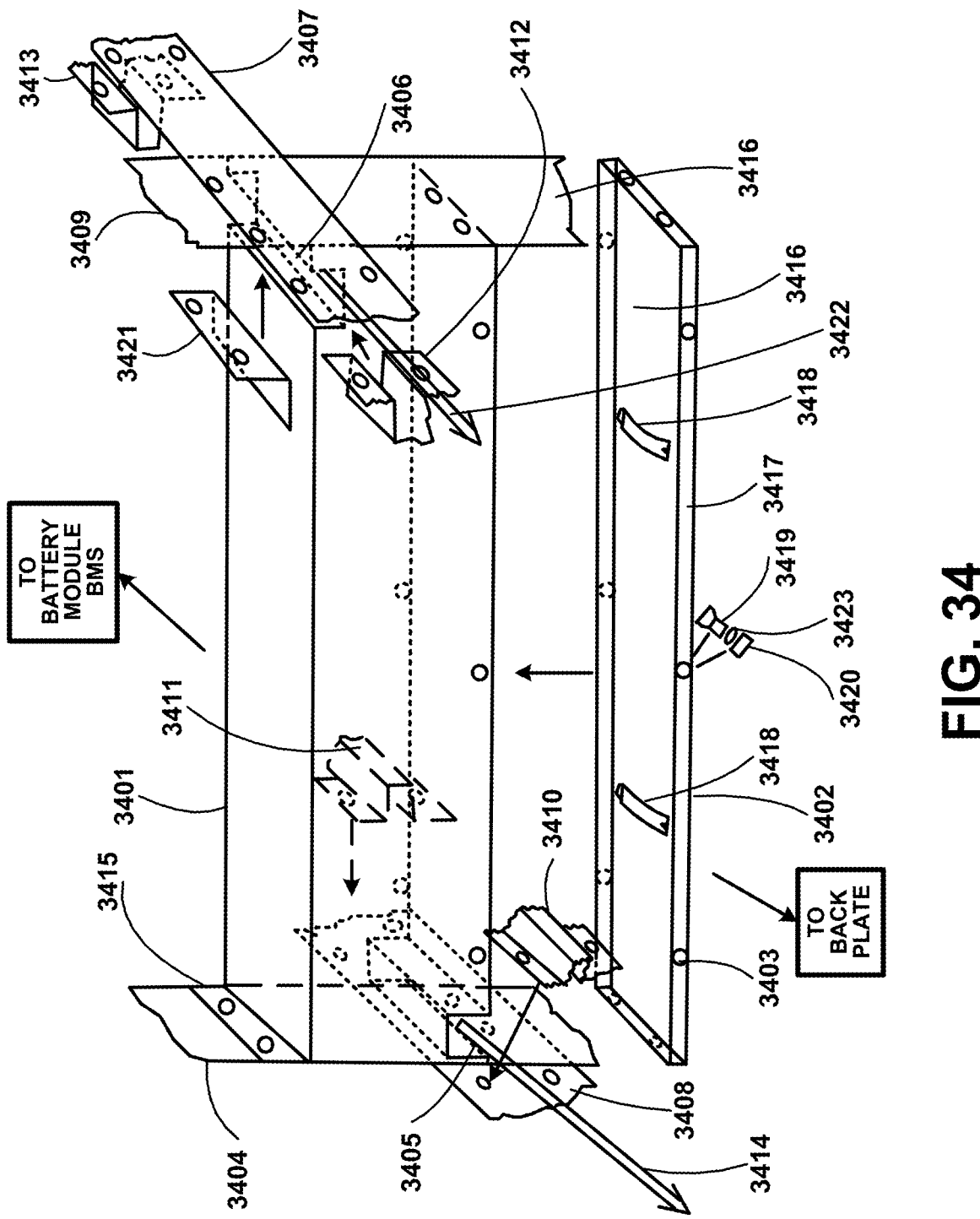
FIG. 34 shows for illustrative purposes only an example of a view of the top metal cover and bottom metal plate for the cells row of one embodiment.

FIG. 34 shows for illustrative purposes only an example of a view of the top metal cover and bottom metal plate for the cells row of one embodiment. FIG. 34 shows a top metal cover for cells row 3401, bottom metal plate with outward borders for top metal cover 3401 for cells row of one embodiment 3402, holes for screws for all connected parts 3403, left side support of cell row 3404, opening for lower left side for power cables, wires 3405, opening for upper right side for power cables, and wires 3406.

FIG. 34 further shows an upper right side part of cell support 3407, lower left side part of cell support 3408, right side support of cell row 3409, left side cover for cables and wires 3410 between cells row cover 3401 and the previous row of metal cover, left side cover 3411 for cables and wires between cells row cover 3401 and next row. Further showing a next row metal cover, right side cover 3413 for cables and wires between cells row cover 3401 and previous row metal cover, right side cover 3413 for cables and wires between cells cover 3401 and next row metal cover.

Also shows power cables, voltage data wires from lower left side 3413 covered by covers 3410 and 3411, left upper angle part of metal cover 3415, right side lower part 3416 of metal cover support 3409, outward borders 3417 facing down from metal plate 3402, flat metal spring 3418 for compression on cells row from the bottom metal cover 3401, screw for securing parts through hole 3419, nut 3420 for screw 3419 and washer 3423, angle plate to cover open upper right side of metal cover 3421, power cables, voltage data wires 3422 from upper right side covered by cover 3412 and 3413 of one embodiment.

Figure 35:
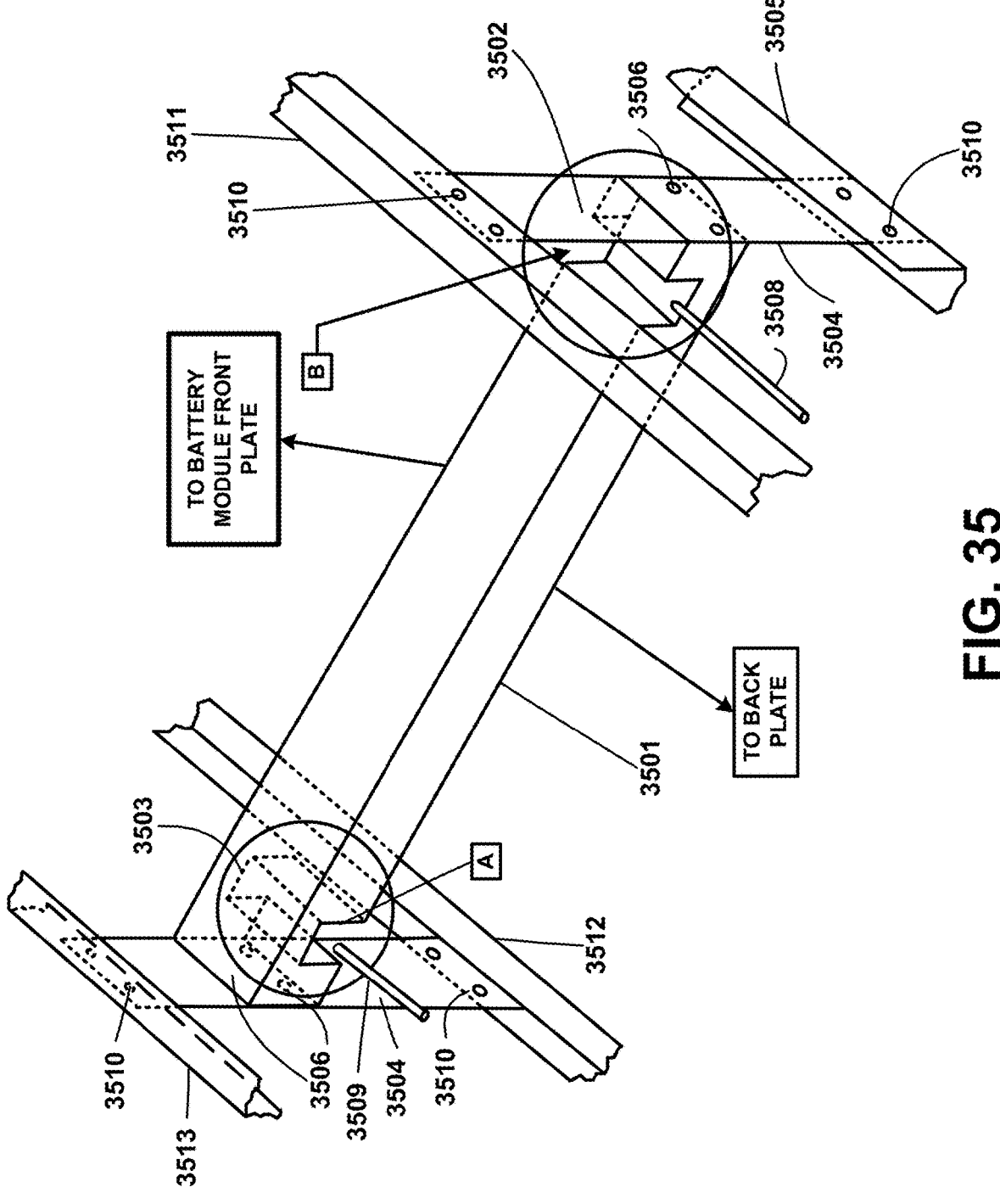
FIG. 35 shows for illustrative purposes only an example of a view of a cells row in a plastic shell but without a metal top cover and bottom metal plate of one embodiment.

FIG. 35 shows for illustrative purposes only an example of a view of cells row in a plastic shell with top and bottom outer plastic plates holding and insulting battery cells in a row of one embodiment. FIG. 35 shows without a metal top cover and the bottom metal plate of one embodiment. FIG. 35 shows a plastic shell of row 3501 having fire retardant, good thermal conducting and electrically not conducting properties. All battery cells in a row covered by one fire retardant plastic plate at the top and one at the bottom and enclosed in plastic shell as of 3501.

FIG. 35 shows a plastic shell of row 3501, upper right side, wires channel 3502, lower left side cables, wires channel 3503, low voltage battery module cells row support 3504, low voltage battery module lower right side frame 3505, holes 3506 for connecting the plastic shell to frame support, right upper side, power cables, temperature sensors, voltage data wires 3508, left lower side power cables, voltage data wires 3509, holes 3510 for connection of cells row support and outer frames, outer upper right side frame 3511, and outer lower left side frame 3512, and outer upper left side frame 3513, battery cells located inside of the fire resistant cover 3501 of one embodiment.

Figure 36:
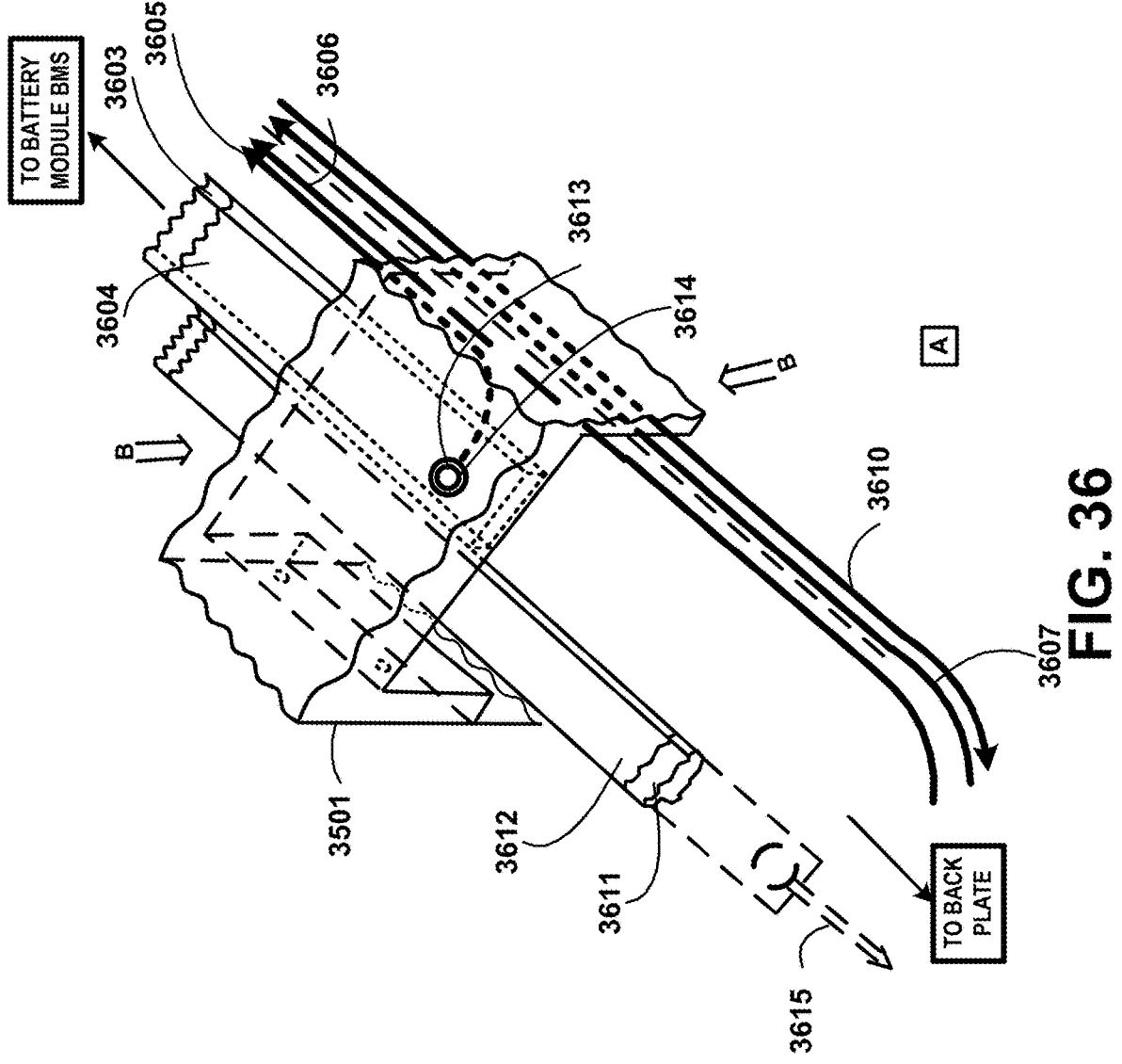
FIG. 36 shows for illustrative purposes only an example of a view of section A of FIG. 35 of one embodiment.

FIG. 36 shows for illustrative purposes only an example of a view of section A of FIG. 35 of one embodiment. FIG. 36 shows the left side power cable to the next cells row 3603, insulation of the power cable to the next cells row 3604, data wire (cells row terminal voltage) from this row 3605, data wires (cells row terminal voltage) from previous cells row 3606, data wire (cells row terminal voltage) till N previous cells row before last cells row wire 3607, plastic shell 3501, data positive wire 3610 for charging state indicator lights in back plate from the front of low voltage battery module BMS, left side negative power cable from last cells row 3611, insulation of cable 3612, screw holding power cable 3613, nut of screw 3614, and data negative wire for charging state indicator lights on back plate from the last battery cells row 3615 of one embodiment. The right-side section B is identical to section A, only it is on the right upper side and has power cables, data wires, and sensor wires going to low voltage battery module BMS 3118 from FIG. 31.

Figure 37:
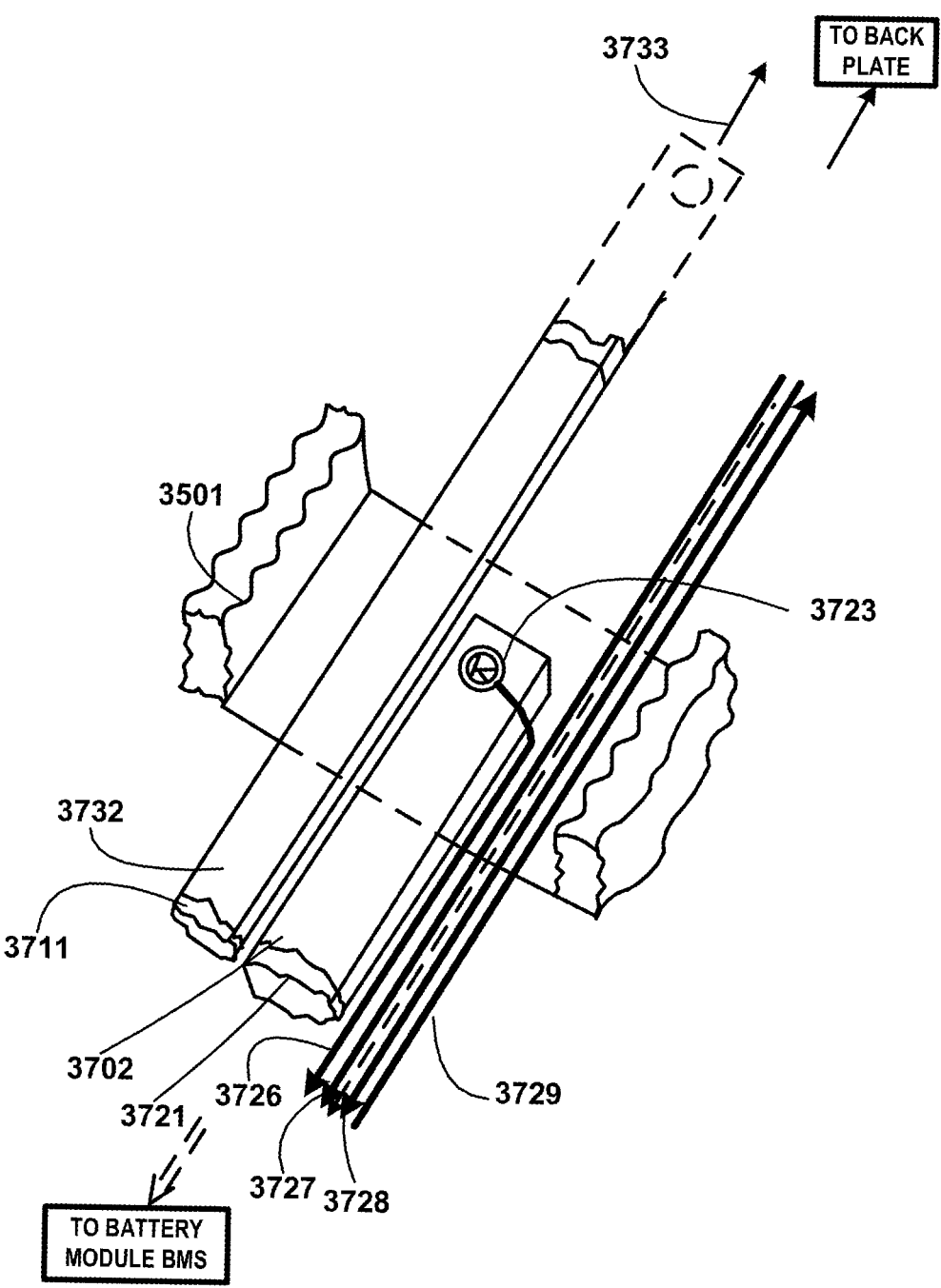
FIG. 37 shows for illustrative purposes only an example of a view from the bottom of section A of FIG. 35 of one embodiment.

FIG. 37 shows for illustrative purposes only an example of a view from the bottom of section A of FIG. 35 of one embodiment by rotation view of FIG. 36 by 180 degrees. FIG. 37 shows a power cable from cells row 3721, insulation of power cable 3702, screw 3723, data wires from voltage of this cells row 3726, data wires from voltage of previous cells row 3727, data wires from voltage till N previous cells row before last cells row data wires from last cells row 3728, data positive wire 3729 for charging state indicator lights on back panel from the front of low voltage battery module BMS 3118 of FIG. 31, plastic shell 3501, left side negative power cable from last cells row 3711, insulation of power cable 3732, and data negative wire for charging state indicator lights on back plate from the last battery cells row 3733 of one embodiment.

Figure 38:
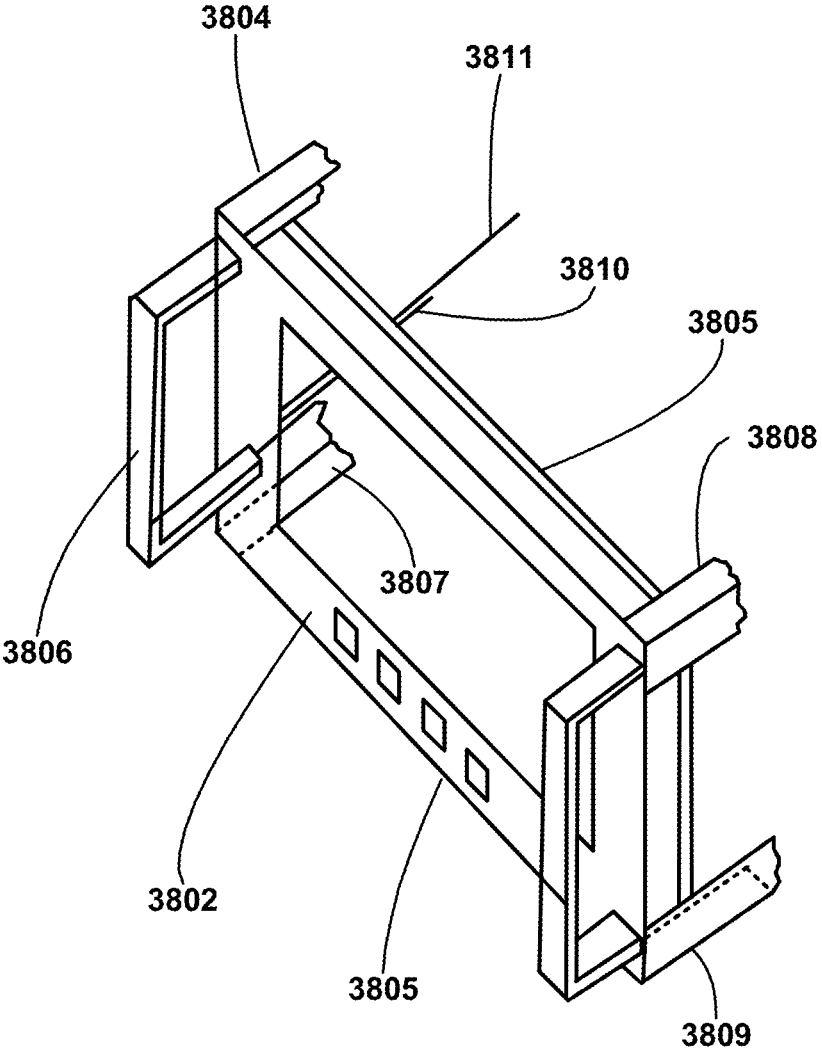
FIG. 38 shows for illustrative purposes only an example of a view of the rear plate of the low voltage battery module of one embodiment.

FIG. 38 shows for illustrative purposes only an example of a view of the rear plate of the low voltage battery module of one embodiment. FIG. 38 shows a back plate 3805, charging state lights 3802, handle 3806, left upper side frame beam 3804, data positive wire 3811 for charging stage indicator lights from the front of low voltage battery module BMS 3118 of FIG. 31, left side lower frame beam 3807, right side upper frame beam 3808, right side lower frame beam 3809, and data negative wire from the last battery cells row for charging state indicator lights 3810 of one embodiment.

Figure 39:
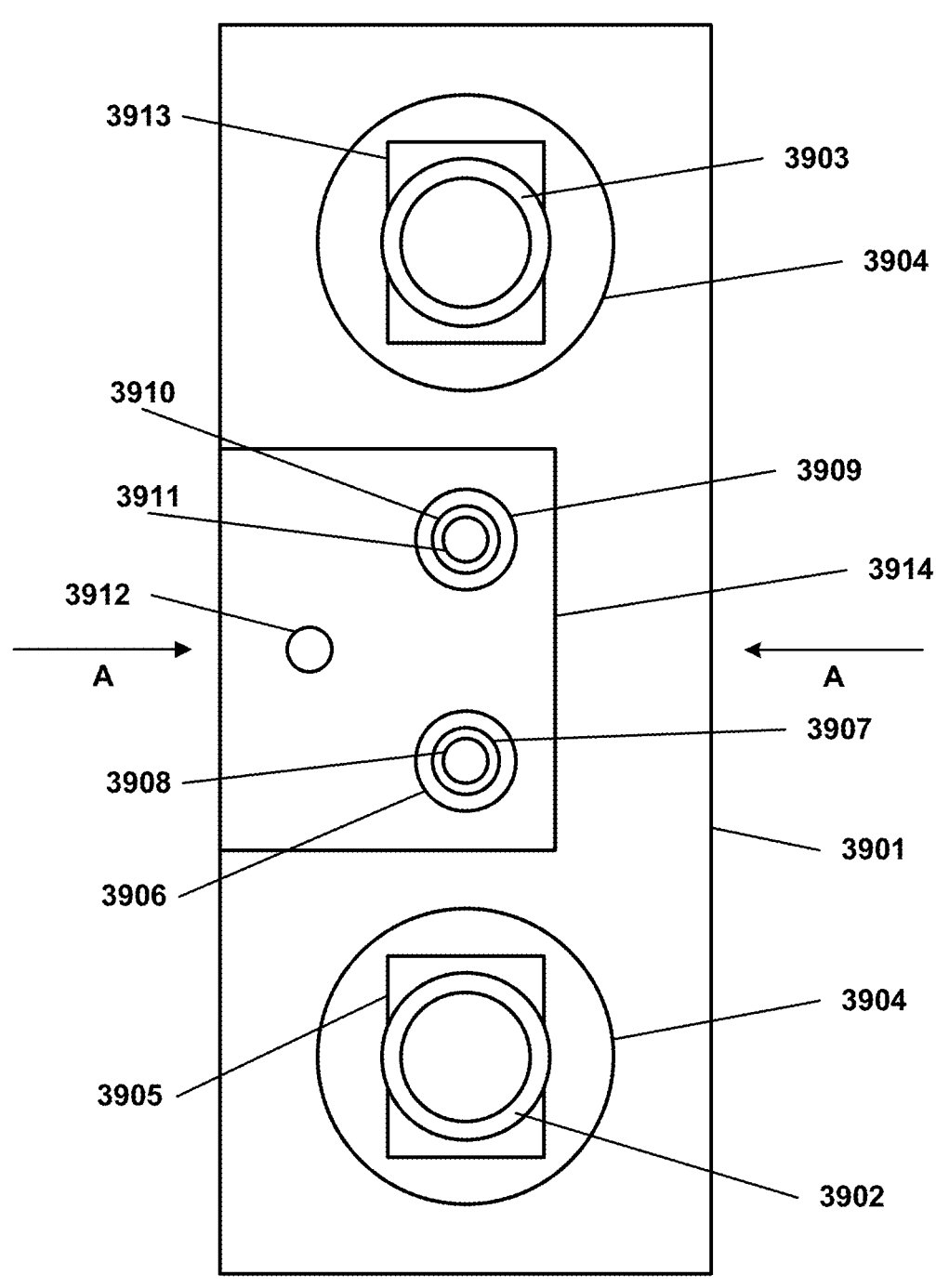
FIG. 39 shows for illustrative purposes only an example of a view of the front panel of the low voltage battery module of one embodiment.

FIG. 39 shows for illustrative purposes only an example of a view of the front panel of the low voltage battery module of one embodiment. FIG. 39 shows a front panel 3901, female negative power connector 3902, female positive power connector 3903, flexible plastic, seal in the form of the cone for negative power connector 3904, flange securing connector at the front plate 3905, flexible plastic, seal in form of the cone for input data RCA connector 3906, outer connection surface of input data RCA connector 3907, inner connection surface of input data RCA connector 3908, flexible plastic, seal in form of cone for output data RCA connector 3909, outer connection surface of output data RCA connector 3910, inner connection surface of output data RCA connector 3911, low voltage battery module switch on/off 3912, flange securing positive power connector 3913, and extension plate 3914 of one embodiment.

Figure 40:
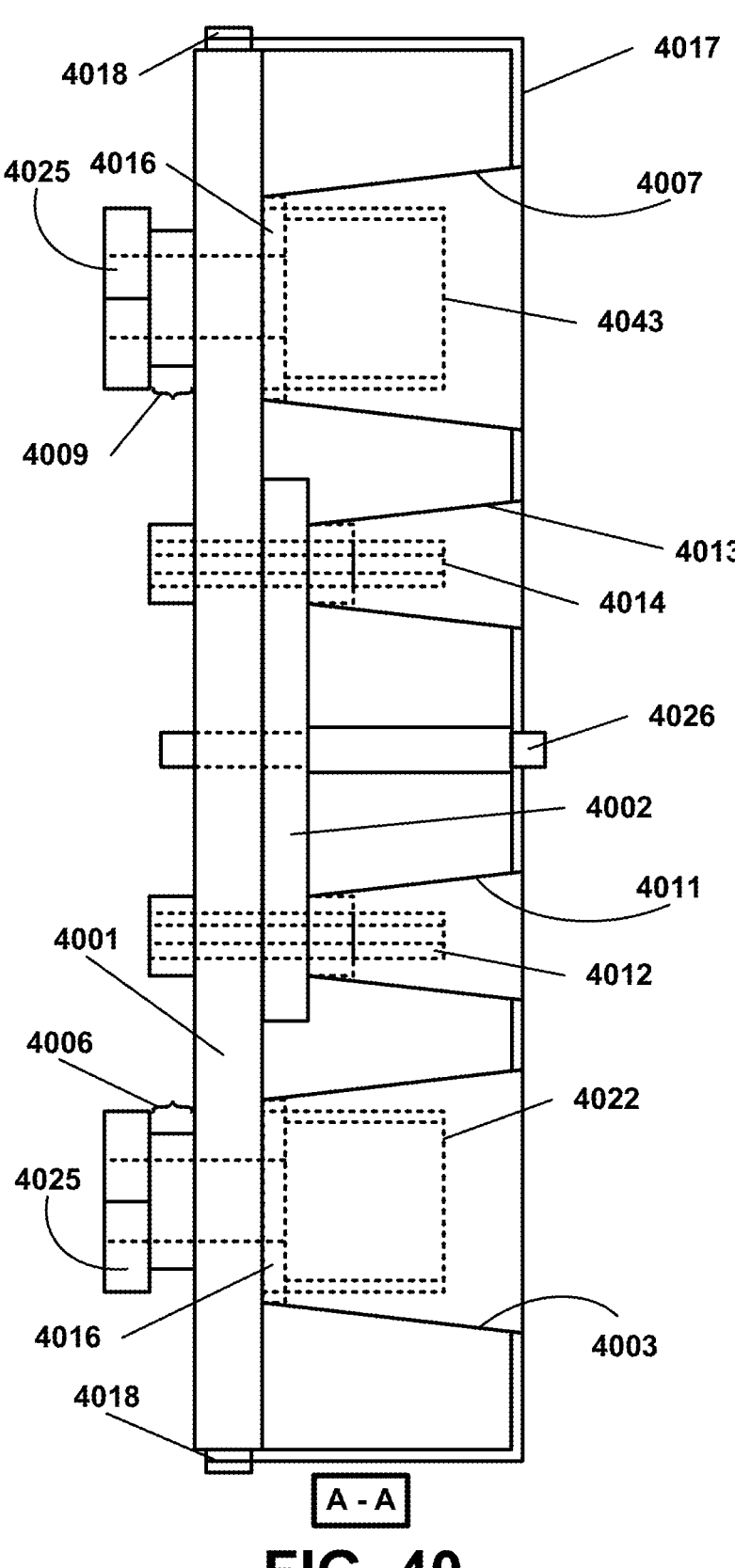
FIG. 40 shows for illustrative purposes only an example of a view from the top of the front panel of the low voltage battery module of one embodiment.

FIG. 40 shows for illustrative purposes only an example of a view from the top of the front panel of the low voltage battery module of one embodiment. FIG. 40 shows a front panel of low voltage battery module 4001, extensions plate 4002 for RCA connectors 4012, and 4014, flexible plastic, seal in the form of the cone for negative power connector 4003, nut 4025, negative power cable at the back of front panel 4006, flexible plastic, the seal of positive power connector 4007, positive power cable at the back of front panel 4009, the flexible plastic seal of input data RCA connector 4011, female RCA connector for input data 4012, flexible plastic, the seal of output data RCA connector 4013, female RCA connector for output data 4014, module switch on/off 4026, flange for securing power connectors to front panel 4016, cover for front panel 4017, and screws holding the cover to front panel 4018, negative power connector 4022, positive power connector 4043 of one embodiment.

Figure 41:
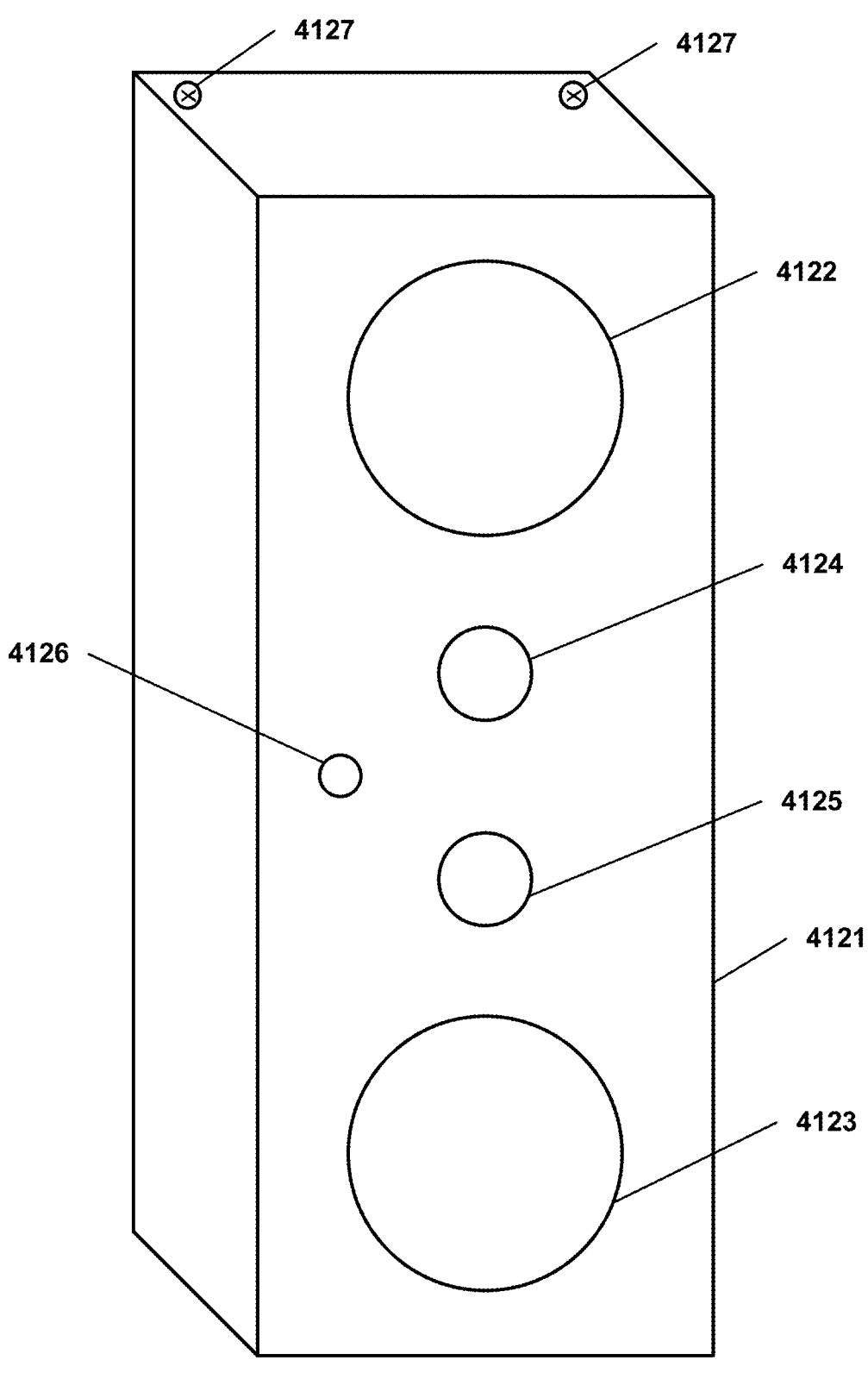
FIG. 41 shows for illustrative purposes only an example of a cover for the front panel of the low voltage battery module of one embodiment.

FIG. 41 shows for illustrative purposes only an example of the front cover of the low voltage battery module of one embodiment. FIG. 41 shows a cover for the front of low voltage battery module 4121, a hole for power positive terminal 4122, a hole for power negative terminal 4123, a hole for output data terminal 4124, a hole for input data terminal 4125, the hole for a push on switch 4126, and screws for connecting the cover to front low voltage battery module panel 4127 of one embodiment.

Figure 42:
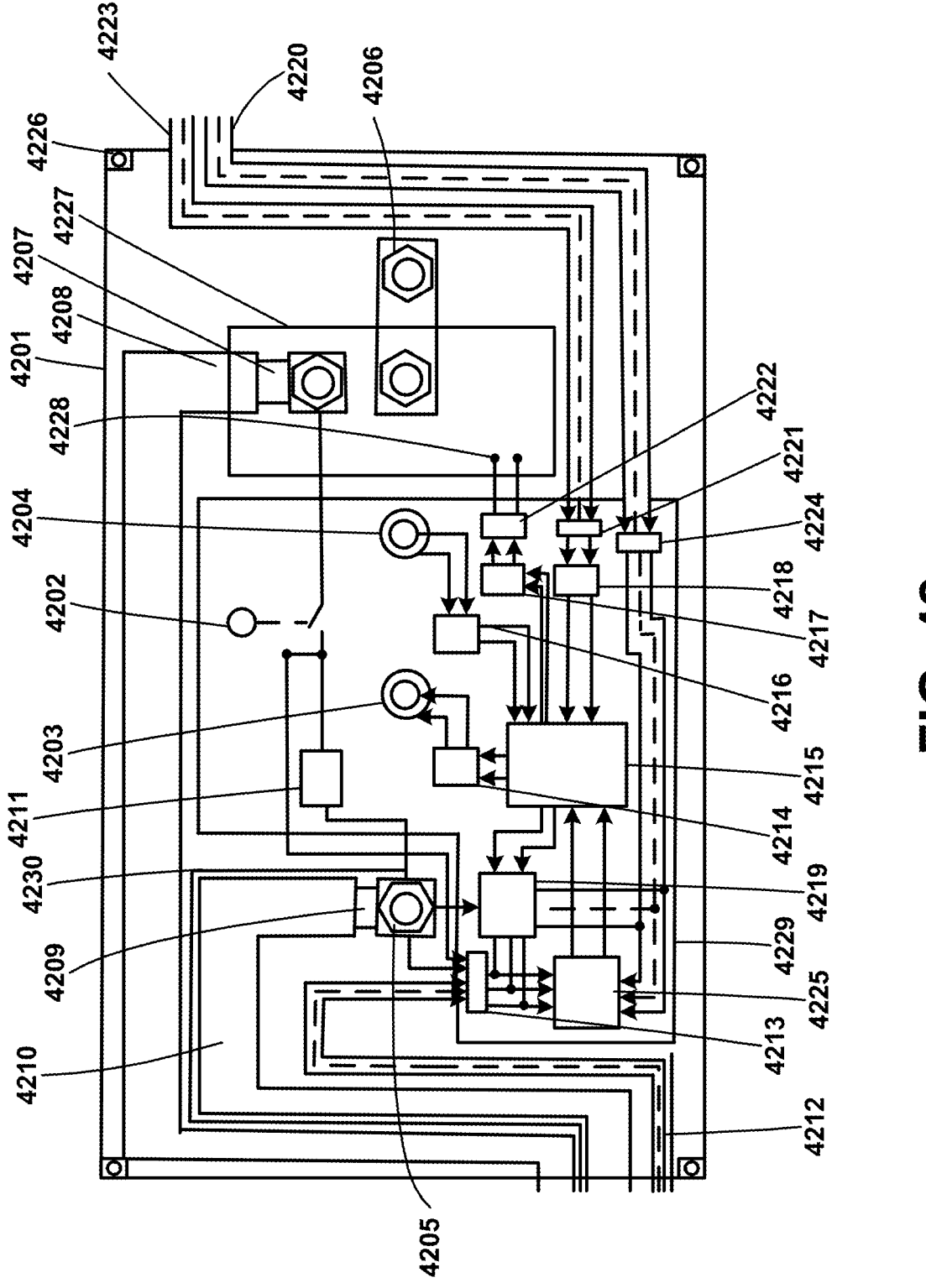
FIG. 42 shows for illustrative purposes only an example of a view of the back part of the front panel of the low voltage battery module with all electronic devices of one embodiment.

FIG. 42 shows for illustrative purposes only an example of a view of the back part of the front panel of the low voltage battery module with all electronic devices of one embodiment. FIG. 42 shows a front plate 4201, module switch on/off 4202, the back part of input data RCA connector 4204, the back part of the positive power connector 4203 and nut 4205, the back part of the negative power connector and nut 4206, negative power cable from low voltage battery module cells rows 4207, insulation 4208, positive power cable from low voltage battery module cells rows 4209, insulator 4210, voltage converter to feed all electronics in low voltage battery module 4211, voltage data wires from left side cells rows 4212, connector for wires 4213, output data electronic unit 4214, microprocessor 4215, input data electronic unit 4216. FIG. 42 further shows electronic unit operating on/off module relay 4217, electronic unit collecting signals from temperature sensors 4218, electronic unit operating charging of cells row 4219, voltage data wires from the right side of low voltage battery module cells rows 4220, a connector for wires from temperature sensors 4221, a connector for wires for operating module output relay on/off 4222, wires from temperature sensors 4223, connector 4224 for wires 4220, electronic unit controlling the voltage of every cells row 4225, nut for back cover screw holding front and back panels 4226, power relay 4227, low voltage relay 4227 contacts 4228, 1 electronic board plate 4229, and wire from positive sources of low voltage battery module to back plate indicator lights of state of charge 4230 of one embodiment.

Figure 43:
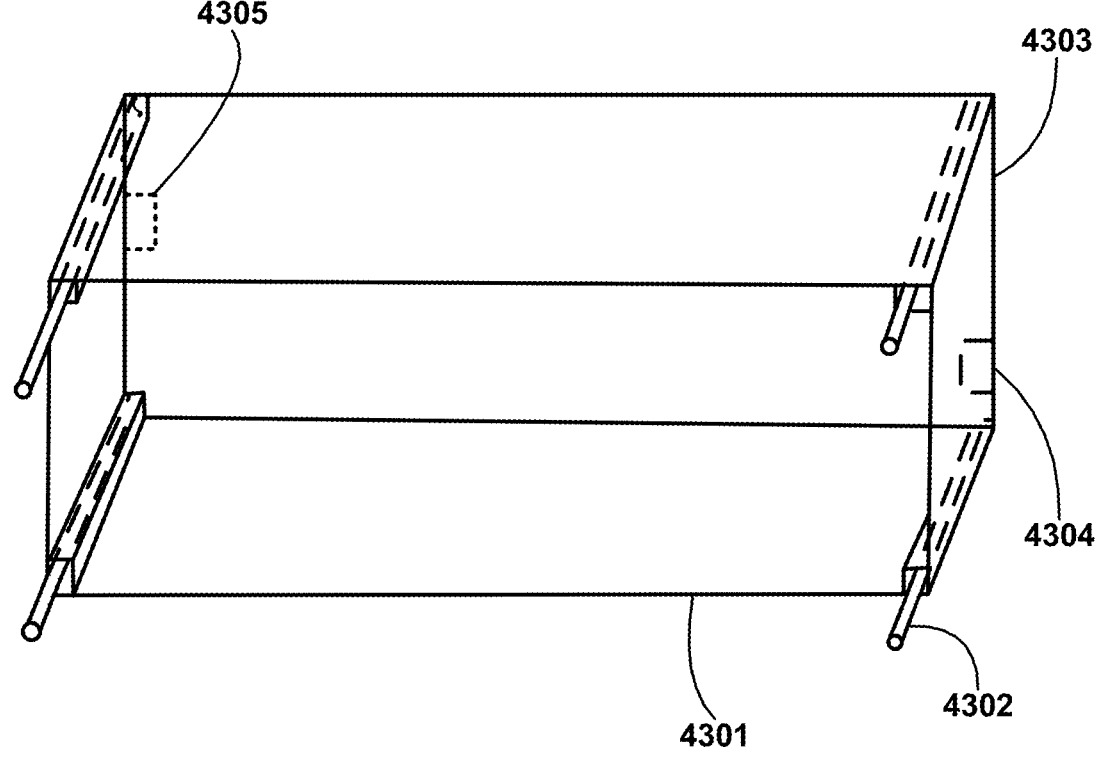
FIG. 43 shows for illustrative purposes only an example of a view of the back cover of the low voltage battery module front plate of one embodiment.

FIG. 43 shows for illustrative purposes only an example of a view of the back cover of the low voltage battery module front plate of one embodiment. FIG. 43 shows a back cover 4301, screw connecting the back cover to front plate 4302, detachable plate at the back 4303, opening for cables and wires from right side 4304, and opening for wires from left side 4305 of one embodiment.

Figure 44:
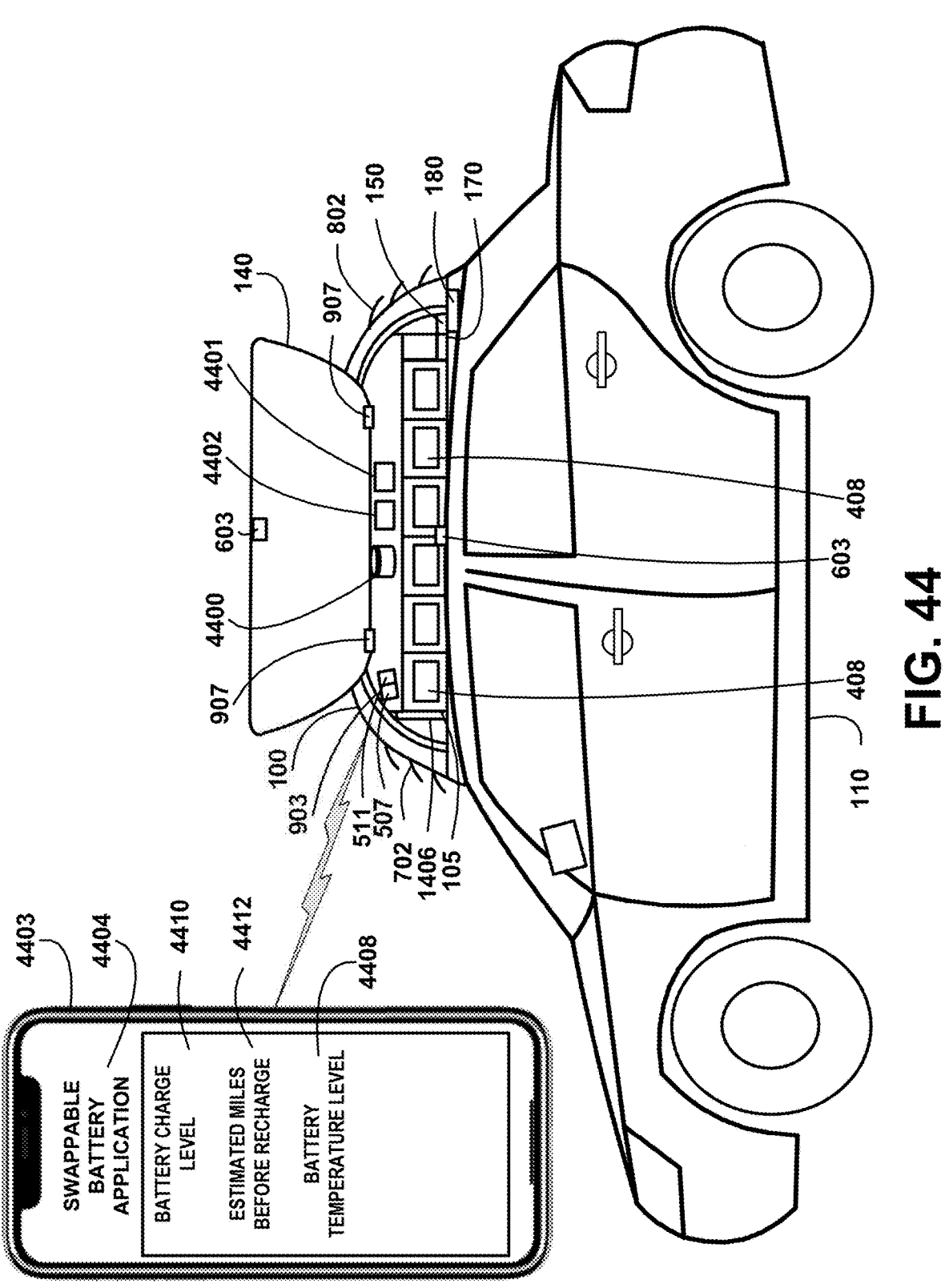
FIG. 44 shows for illustrative purposes only an example of a swappable battery application of one embodiment.

FIG. 44 shows for illustrative purposes only an example of a swappable battery application of one embodiment. FIG.

44 shows a user's smartphone 4403 having a swappable battery application 4404 installed, cage structure 105 with the metal air filter in front 1406. The front air ventilation louvers 702 provides airflow to cool the batteries. A variable speed fan 507 circulates warm air from the electrical heater 511 when temperatures drop. A rear air ventilation section with louvers 802 to increase cooling when temperatures increase. The gutters 903 are shown near the top cover 100 which includes opening panel hinges 907 that allows the opening side panels 140 to open when the opening panel's lock 603 is unlocked. The main battery monitoring system (BMS) 150 monitors all the low voltage battery modules and connectors and connects to the electrified vehicle 110 EV main power system through cable 180. Other electronic devices 170 are connected to the swappable low voltage battery module 340 units.

The swappable battery application 4404 is wirelessly coupled to a communication device 4402 located in the top cover. The communication device 4402 is coupled to a database memory device 4400 through interface 4401 and gets a signal from BMS 150, wherein both are also located in the top cover. The communication device 4402 transmits temperature data to the swappable battery application 4404. The swappable battery application 4404 determines a battery charge level 4410, estimated miles before recharge 4412, and also battery temperature level 4408 and displays the determinations on the screen of the user's smartphone 4403.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A swappable battery system for electrified vehicles, comprising:

a metal or composite materials frame configured to be coupled to a roof of an electrified vehicle, the frame consisting of tubes configured to form a rigid compartment;

a rooftop cover coupled to the rigid compartment and configured to enclose at least a portion of the frame;

a fire-retardant hard plastic plate attached to a bottom portion of the frame and forming a floor of the frame structure, the plate having outward borders configured to provide safety insulation from the vehicle;

at least two openable side panels coupled to the rooftop cover and configured to provide access to the rigid compartment;

a front air ventilation section with louvers, a rear air ventilation section with louvers, and side air ventilation sections with louvers, the louvers being coupled to the rigid compartment and configured to open and close to allow airflow to regulate a temperature within the rigid compartment;

a plurality of swappable low voltage battery modules removably installed in the rigid compartment and configured to supply energy to operate battery management controls and provide power to an electric motor of the electrified vehicle; and a main battery management system coupled to the plurality of swappable low voltage battery modules and configured to monitor voltage, temperature, charge, and operational states of the swappable low voltage battery modules and associated devices to extend the electrified vehicle's driving range.

2. The swappable battery system of claim 1, wherein the main battery management system is further configured to control the temperature within the rigid compartment using at least one moisture sensor and at least one temperature sensor to activate airflow via the louvers, at least one cooling fan, and at least one heater.

3. The swappable battery system of claim 1, wherein the main battery management system is further configured to control energy distribution through a DC/DC converter, a voltage sensor, a current sensor, a high voltage high current relay, and a high voltage high current circuit breaker.

4. The swappable battery system of claim 1, wherein the main battery management system is further coupled to each of the plurality of swappable low voltage battery modules and configured to monitor voltage and temperature thereof.

5. The swappable battery system of claim 1, wherein the plurality of swappable low voltage battery modules are configured to extend the electrified vehicle's driving range.

6. The swappable battery system of claim 1, wherein the plurality of swappable low voltage battery modules are configured to have portability features and are further configured to be exchanged with fully charged swappable low voltage battery modules at designated locations or charged at a power source using adaptors.

7. The swappable battery system of claim 1, further comprising an airbag device disposed within the rigid compartment and configured to deploy upon impact as detected by at least one impact sensor coupled to the roof of the electrified vehicle or as detected by at least one impact sensor coupled to side portions of the electrified vehicle.

8. A swappable battery system for electrified vehicles comprising:
   a metal or composite materials frame coupled to an electrified vehicle roof consisting of tubes configured to form a rigid compartment;
   a rooftop cover coupled to the rigid compartment configured to enclose a portion of the frame;
   a fire retardant hard plastic plate attached to the bottom of the frame forming a floor of the frame structure and having outward borders for safety insulation from the vehicle;
   at least two openable side panels coupled to the rooftop cover configured to provide access to the rigid compartment;
   a front air ventilation section with louvers, a rear air ventilation section with louvers, and side air ventilation sections with louvers coupled to the rigid compartment, wherein the louvers are configured to open and close to allow airflow to regulate a temperature within the rigid compartment;
   a plurality of swappable low voltage battery modules installed and safely removable in the rigid compartment configured to supply energy to operate battery management controls and provide power to an electrified vehicle's electric motor;
   a main battery management system coupled to the plurality of swappable low voltage battery modules configured to monitor voltage, temperature, charge, and operations of the swappable low voltage battery modules and devices extending the electrified vehicle's driving range; and
   a pyro-fuse coupled to the main battery management system configured to cut an electric current from the plurality of swappable low voltage battery modules in critical situations where electrical safety is vital.

9. The swappable battery system of claim 8, wherein, for safety construction and connection to output power having along the middle part of the frame right side and left side hard plastic fire retardant plates configured to guide all power cables and data wires to the main battery management system.

10. The swappable battery system of claim 8, wherein a lock mechanism located in the middle of the opening panel configured to be opened or closed with a metal key or electric actuator, energized by a signal from wires from the main battery management system operated from wireless remote control.

11. The swappable battery system of claim 8, further comprising in left, right, top, and bottom of each low voltage battery module compartment angle plates with flat spring stripes for holding and securing low voltage battery module in each of the low voltage battery module compartments.

12. The swappable battery system of claim 8, further comprising a compact, lightweight design of individual low voltage battery modules consisting of a front panel, a back panel, and 4 metal angle plates as a frame connected to a front panel and a back panel.

13. The swappable battery system of claim 8, wherein having low voltage battery module secured in the frame with local lock mechanism.

14. The swappable battery system of claim 8, further comprising a plurality of low voltage battery modules having numerous battery cells connected in parallel in a row and connected in series between rows.

15. A swappable battery system for electrified vehicles comprising:
   a metal or composite materials frame coupled to an electrified vehicle roof consisting of tubes configured to form a rigid compartment;
   a rooftop cover coupled to the rigid compartment configured to enclose a portion of the frame;
   a fire retardant hard plastic plate attached to the bottom of the frame forming a floor of the frame structure and having outward borders for safety insulation from the vehicle;
   at least two openable side panels coupled to the rooftop cover configured to provide access to the rigid compartment;
   a front air ventilation section with louvers, a rear air ventilation section with louvers, and side air ventilation sections with louvers coupled to the rigid compartment, wherein the louvers are configured to open and close to allow airflow to regulate a temperature within the rigid compartment;
   a plurality of swappable low voltage battery modules installed and safely removable in the rigid compartment configured to supply energy to operate battery management controls and provide power to the vehicle's electric motor;
   a main battery management system coupled to the plurality of swappable low voltage battery modules configured to monitor voltage, temperature, charge, and operations of the swappable low voltage battery modules and devices extending the electrified vehicle's driving range;
   a pyro-fuse coupled to the battery management system configured to cut an electric current from the plurality of swappable low voltage battery modules in critical situations where electrical safety is vital;

a plurality of local lock mechanisms coupled to the rigid compartment configured to secure a plurality of low voltage battery modules to the frame; and wherein the plurality of swappable low voltage battery modules are connected in series with power cables and having wires and data transfer connectors.

16. The swappable battery system of claim 15, wherein the plurality of low voltage battery modules are further configured to have several cell rows each enclosed between the top and bottom fire retardant plastic plates in a plastic shell having high thermal conducting and electrically non-conducting properties and having a connection to power cables, data wires from the lower left side and power cables and data wires from the upper right side.

17. The swappable battery system of claim 15, further comprising the plurality of low voltage battery module cells row which are further configured to have each cell row in a plastic shell covered with cover from light metal and bottom metal plate.

18. The swappable battery system of claim 15, wherein the plurality of low voltage battery modules are further configured to have high voltage high current power positive and negative female connectors having flexible plastic covers/seals around them and around data connectors to prevent moisture and have a good connection.

19. The swappable battery system of claim 15, further comprising in each low voltage battery module high voltage high current power relay to safely connect/disconnect the output from swappable low voltage battery modules in case of accident or by request from the main battery management system.

20. The swappable battery system of claim 15, wherein the plurality of low voltage battery modules are further configured to have all electronics for controlling temperature of cells rows, voltage of cells rows and balancing charging of cells rows.

\* \* \* \* \*